US012583042B2

(12) United States Patent
Yamada et al.

(10) Patent No.: US 12,583,042 B2
(45) Date of Patent: Mar. 24, 2026

(54) HEAT EXCHANGER, HEAT PUMP DEVICE, AND METHOD OF MANUFACTURING HEAT EXCHANGER

(71) Applicant: DAIKIN INDUSTRIES, LTD., Osaka (JP)

(72) Inventors: Kouju Yamada, Osaka (JP); Tomoki Hirokawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 871 days.

(21) Appl. No.: 17/610,076

(22) PCT Filed: May 8, 2020

(86) PCT No.: PCT/JP2020/018729
§ 371 (c)(1),
(2) Date: Nov. 9, 2021

(87) PCT Pub. No.: WO2020/230738
PCT Pub. Date: Nov. 19, 2020

(65) Prior Publication Data
US 2022/0212278 A1      Jul. 7, 2022

(30) Foreign Application Priority Data
May 10, 2019      (JP) ................................. 2019-090093

(51) Int. Cl.
*F28F 9/02* (2006.01)
*B23K 1/00* (2006.01)
(Continued)

(52) U.S. Cl.
CPC .............. *B23K 1/0012* (2013.01); *B23K 1/19* (2013.01); *F28F 9/0246* (2013.01); *F28F 9/18* (2013.01);
(Continued)

(58) Field of Classification Search
CPC ...... F28F 9/0219; F28F 9/0221; F28F 9/0278; F28F 2275/04; F28F 9/0209; F28F 9/0275; F28D 1/05375–1/05391; F25B 39/04
See application file for complete search history.

(56) References Cited

U.S. PATENT DOCUMENTS

| | | | |
|---|---|---|---|
| 2002/0042745 A1* | 4/2002 | Nacey | G16H 20/60 |
| | | | 707/999.009 |
| 2003/0085030 A1* | 5/2003 | Gowan | F28F 9/0212 |
| | | | 165/173 |

(Continued)

FOREIGN PATENT DOCUMENTS

| | | |
|---|---|---|
| EP | 0682224 A1 | 11/1995 |
| FR | 2947330 A1 | 12/2010 |

(Continued)

OTHER PUBLICATIONS

International Preliminary Report on Patentability issued in corresponding International Patent Application No. PCT/JP2020/018729, mailed on Nov. 25, 2021 (9 pages).
(Continued)

*Primary Examiner* — Frantz F Jules
*Assistant Examiner* — Jason N Thompson
(74) *Attorney, Agent, or Firm* — Osha Bergman Watanabe & Burton LLP

(57) ABSTRACT

A heat exchanger includes: a header; and heat transfer tubes connected to the header. The header includes a first member, a second member, and a third member. A brazing layer between the second member and the third member has a melt rate, at predetermined temperature, that is larger than a melt rate, at the predetermined temperature, of at least one of: a (Continued)

brazing layer between the first member and the second member; and a brazing layer between the first member and the third member.

9 Claims, 19 Drawing Sheets

(51) Int. Cl.
| | |
|---|---|
| *B23K 1/19* | (2006.01) |
| *F25B 39/04* | (2006.01) |
| *F28F 9/18* | (2006.01) |
| *B23K 101/14* | (2006.01) |
| *B23K 103/10* | (2006.01) |

(52) U.S. Cl.
CPC ...... *B23K 2101/14* (2018.08); *B23K 2103/10* (2018.08); *F28F 2275/04* (2013.01)

(56) References Cited

U.S. PATENT DOCUMENTS

| | | | | |
|---|---|---|---|---|
| 2007/0251682 A1* | 11/2007 | Sasaki | ..................... | F28F 1/022 |
| | | | | 165/178 |
| 2012/0204595 A1* | 8/2012 | Tamaki | ................. | F28F 9/0278 |
| | | | | 165/151 |
| 2014/0272463 A1* | 9/2014 | Marois | ................. | B23K 35/288 |
| | | | | 228/173.6 |
| 2014/0305159 A1 | 10/2014 | Katoh et al. | | |
| 2016/0003548 A1 | 1/2016 | Saito et al. | | |
| 2016/0195335 A1 | 7/2016 | Nishiyama et al. | | |
| 2017/0260612 A1* | 9/2017 | Janssen | .................. | C22C 21/02 |
| 2018/0259269 A1* | 9/2018 | Tsubota | ............. | F28D 1/05341 |
| 2019/0033018 A1* | 1/2019 | Higashiiue | ............... | F28F 9/22 |

FOREIGN PATENT DOCUMENTS

| | | |
|---|---|---|
| JP | H02-127992 A | 5/1990 |
| JP | H07-305994 A | 11/1995 |
| JP | H08-276262 A | 10/1996 |
| JP | 2010-038378 A | 2/2010 |
| JP | 2013-137183 A | 7/2013 |
| WO | 2015/004719 A1 | 1/2015 |

OTHER PUBLICATIONS

International Search Report issued in corresponding International Application No. PCT/JP2020/018729, mailed on Aug. 11, 2020 (7 pages).

Written Opinion issued in corresponding International Application No. PCT/JP2020/018729, mailed on Aug. 11, 2020 (6 pages).

Extended European Search Report issued in corresponding European Patent Application EP 20805257.1 dated Jun. 30, 2022 (9 pages).

* cited by examiner

11

27

28

28G

28a

28b

29b

29

29a

74

74a

74x

HEAT EXCHANGER, HEAT PUMP DEVICE, AND METHOD OF MANUFACTURING HEAT EXCHANGER

TECHNICAL FIELD

The present disclosure relates to a heat exchanger, a heat pump device, and a method of manufacturing the heat exchanger.

BACKGROUND

A refrigerant cycle apparatus such as an air conditioner conventionally includes a heat exchanger provided with a heat transfer tube allowing a refrigerant to flow therein and connected to a header.

An exemplary heat exchanger described in Patent Literature 1 (WO 2015/004719 A) includes a header constituted by a plurality of laminated plate-shaped members. The header includes bare materials provided with no brazing filler material, and clad materials having front and rear surfaces each provided with the brazing filler material, and the bare materials and the clad materials are laminated alternately and are joined by brazing.

Patent Literature

Patent Literature 1: WO 2015/004719 A

When the plurality of members mentioned above is joined by brazing, a brazing filler material positioned far from a heat source for provision of heat is less likely to melt in comparison to a brazing filler material positioned close to the heat source, to possibly cause defective brazing.

SUMMARY

In one or more embodiments, a heat exchanger inhibits defective brazing of a header constituted by a plurality of members, a heat pump device, and a method of manufacturing the heat exchanger.

A heat exchanger according to one or more embodiments includes a header, and a plurality of heat transfer tubes connected to the header. The header has a plurality of members including a first member, a second member, and a third member to be brazed. A brazing layer between the second member and the third member has a melt rate, at a predetermined temperature, being larger than a melt rate, at the predetermined temperature, of at least one of a brazing layer between the first member and the second member and a brazing layer between the first member and the third member.

There may be provided either one or both of the brazing layer between the first member and the second member and the brazing layer between the first member and the third member.

The predetermined temperature should not be limited and, for example, may be a temperature at which a melt is generated at both a brazing layer between the second member and the third member and the brazing layer between the first member and the second member, may be a temperature at which a melt is generated at both the brazing layer between the second member and the third member and the brazing layer between the first member and the third member, or may be a temperature at which a melt is generated at all the brazing layer between the second member and the third member, the brazing layer between the first member and the second member, and the brazing layer between the first member and the third member. The temperature may be, for example, 580° C. or more, or 590° C. or more. The predetermined temperature has an upper limit that should not be limited, and the upper limit may be 660° C. or less and can be 630° C. or less. An ambient temperature in a furnace should not be limited, and may be exemplarily 1000° C. or more and 1300° C. or less.

Though not limited, the heat exchanger may be constructed such that the header has a vertical or horizontal longitudinal direction.

The heat exchanger can achieve an excellent joining state of brazing between the second member and the third member, even in a case where the brazing layer between the second member and the third member is lower in temperature during brazing than at least one of the brazing layer between the first member and the second member and the brazing layer between the first member and the third member.

A heat exchanger according to one or more embodiments includes a header, and a plurality of heat transfer tubes connected to the header. The header has a plurality of members including a first member, a second member, and a third member to be brazed. The brazing layer between the second member and the third member has a silicon content larger than a silicon content of at least one of the brazing layer between the first member and the second member and the brazing layer between the first member and the third member.

The brazing layer between the second member and the third member preferably contains a silicon alloy larger in silicon content than a silicon alloy in at least one of the brazing layer between the first member and the second member and the brazing layer between the first member and the third member.

The predetermined temperature should not be limited and, for example, may be a temperature at which a melt is generated at both a brazing layer between the second member and the third member and the brazing layer between the first member and the second member, may be a temperature at which a melt is generated at both the brazing layer between the second member and the third member and the brazing layer between the first member and the third member, or may be a temperature at which a melt is generated at all the brazing layer between the second member and the third member, the brazing layer between the first member and the second member, and the brazing layer between the first member and the third member. The temperature may be, for example, 580° C. or more, or 590° C. or more. The predetermined temperature has an upper limit that should not be limited, and the upper limit may be 660° C. or less and can be 630° C. or less. Ambient temperature in a furnace should not be limited, and may be exemplarily 1000° C. or more and 1300° C. or less.

The heat exchanger can achieve an excellent joining state of brazing between the second member and the third member, even in a case where the brazing layer between the second member and the third member is lower in temperature during brazing than at least one of the brazing layer between the first member and the second member and the brazing layer between the first member and the third member.

In one or more embodiments of the heat exchanger, the brazing layer between the second member and the third member has a melt rate, at predetermined temperature, being larger than a melt rate at the predetermined temperature of at least one of the brazing layer between the first member and the second member and the brazing layer between the first member and the third member. The heat exchanger can achieve an excellent joining state of brazing between the second member and the third member, even in a case where the brazing layer between the second member and the third member is lower in temperature during brazing than at least one of the brazing layer between the first member and the second member and the brazing layer between the first member and the third member.

In one or more embodiments of the heat exchanger, the brazing layer between the second member and the third member is disposed inside at least one of the brazing layer between the first member and the second member and the brazing layer between the first member and the third member.

In one or more embodiments of the heat exchanger, the brazing layer between the second member and the third member is disposed inside at least one of the brazing layer between the first member and the second member and the brazing layer between the first member and the third member. The heat exchanger thus achieves an excellent joining state of brazing between the second member and the third member even in a case where the brazing layer between the second member and the third member receives less heat, during brazing, than at least one of the brazing layer between the first member and the second member and the brazing layer between the first member and the third member.

In one or more embodiments of the heat exchanger, the first member has a first portion having a plate shape. The first portion has a plurality of first openings into which the heat transfer tubes are inserted. The third member is a plate-shaped member having a plurality of second openings into which the heat transfer tubes are inserted. The first portion and the third member are laminated in a thickness direction.

The heat exchanger achieves joining by brazing of the inserted heat transfer tubes in the first openings in the first portion of the first member. The first member and the third member are laminated in the thickness direction to secure a total thickness for improvement in strength of the header. This configuration allows the first member to be thinned while securing strength of the header, for less friction between circumferential surfaces of the heat transfer tubes and the first openings upon insertion of the heat transfer tubes.

In one or more embodiments of the heat exchanger, in a view in an extending direction of the heat transfer tubes, each of the first openings has an outline positioned inside an outline of a corresponding one of the second openings.

In the heat exchanger, any excessive brazing filler material around ends of the heat transfer tubes during brazing can be shifted into regions outside the heat transfer tubes and inside the second openings of the third member. This inhibits the brazing filler material from blocking flow paths in the heat transfer tubes.

In one or more embodiments of the heat exchanger, each of the first member, the second member, and the third member contains aluminum or an aluminum alloy.

In one or more embodiments of the heat exchanger, each of the first member, the second member, and the third member has a thickness equal to or less than 3 mm.

Each of the first member, the second member, and the third member has a thickness equal to or less than 3 mm in the heat exchanger, and each of the members can thus be easily formed into a specific shape.

In one or more embodiments, a heat pump device is equipped with the heat exchanger according to any of the above-described embodiments.

In one or more embodiments, a method of manufacturing a heat exchanger including a header and a plurality of heat transfer tubes connected to the header involves laminating and brazing. The header includes a first member, a second member, and a third member. The first member has a clad layer. The third member has a clad layer. The laminating involves laminating the first member, the second member, and the third member with positioning the clad layer of the first member on the second member side and positioning the clad layer of the third member on the second member side. The brazing involves heating the first member, the second member, and the third member to braze the first member and the second member as well as braze the second member and the third member. The clad layer of the third member has a melt rate at predetermined temperature larger than a melt rate at the predetermined temperature of the clad layer of the first member.

The second member may optionally be provided with a clad layer in addition to the first member and the third member.

The predetermined temperature should not be limited. For example, it may be a temperature at which a melt is generated at both the clad layer of the first member and the clad layer of the third member, and may be, for example, 580° C. or more, or 590° C. or more. The predetermined temperature has an upper limit that should not be limited, and the upper limit may be 660° C. or less and can be 630° C. or less. Ambient temperature in a furnace should not be limited, and may be exemplarily 1000° C. or more and 1300° C. or less.

The method of manufacturing the heat exchanger can provide the heat exchanger in an excellent joining state of brazing between the second member and the third member even in a case where the clad layer of the third member is lower in temperature than the clad layer of the first member during brazing by heating the first member, the second member, and the third member.

In one or more embodiments, a method of manufacturing a heat exchanger including a header and a plurality of heat transfer tubes connected to the header involves laminating and brazing. The header includes a fifth member, a sixth member, and a seventh member. The seventh member has a first clad layer and a second clad layer. The laminating involves laminating the fifth member, the sixth member, and the seventh member with positioning the first clad layer on the fifth member side and positioning the second clad layer on the sixth member side. The brazing involves heating the fifth member, the sixth member, and the seventh member to braze the fifth member and the seventh member as well as braze the sixth member and the seventh member with the second clad layer being interposed therebetween. The second clad layer has a melt rate at predetermined temperature larger than a melt rate at the predetermined temperature of the first clad layer.

The fifth or sixth member may optionally be provided with a clad layer in addition to the seventh member.

The predetermined temperature should not be limited. For example, it may be a temperature at which a melt is generated at both the first clad layer and the second clad layer, and may be, for example, 580° C. or more, or 590° C. or more. The predetermined temperature has an upper limit that should not be limited, and the upper limit may be 660° C. or less and can be 630° C. or less. Ambient temperature in a furnace should not be limited, and may be exemplarily 1000° C. or more and 1300° C. or less.

The method of manufacturing the heat exchanger can provide the heat exchanger in an excellent joining state of brazing between the sixth member and the seventh member even in a case where the second clad layer is lower in temperature than the first clad layer during brazing by heating the fifth member, the sixth member, and the seventh member.

DETAILED DESCRIPTION

Description will be made hereinafter to an air conditioner according to one or more embodiments, including a heat exchanger of the present disclosure.

(1) CONFIGURATION OF AIR CONDITIONER

An air conditioner 1 will be described with reference to drawings.

Figure 1:
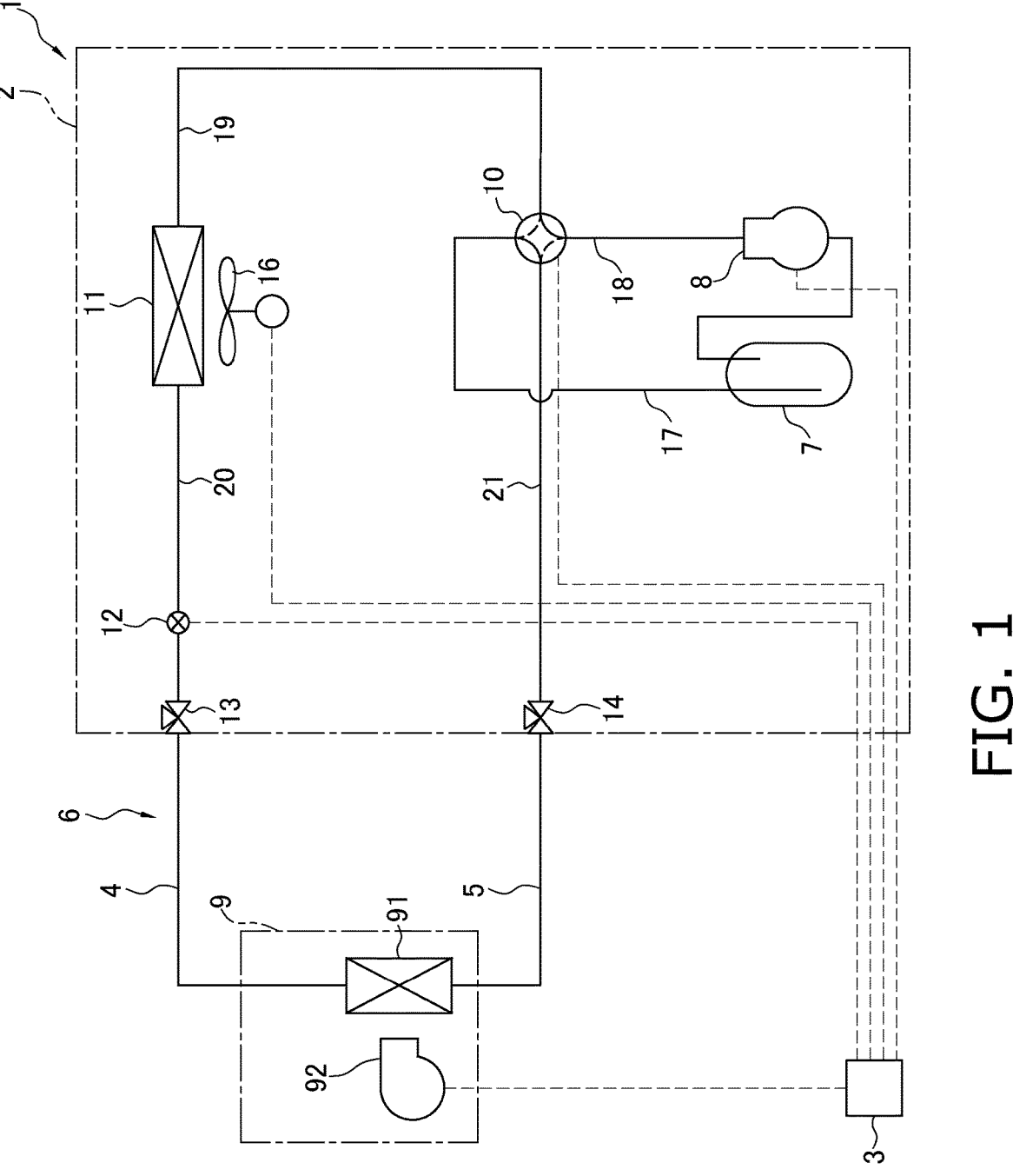
FIG. 1 is a schematic configuration diagram of an air conditioner.

FIG. 1 is a schematic configuration diagram of the air conditioner 1 including, as an outdoor heat exchanger 11, a heat exchanger according to one or more embodiments of the present disclosure.

The air conditioner 1 (exemplifying a heat pump device) is configured to achieve a vapor compression refrigeration cycle to cool and heat an air conditioning target space. Examples of the air conditioning target space include a space in a building such as an office building, a commercial facility, or a residence. The air conditioner merely exemplifies a refrigerant cycle apparatus. The heat exchanger according to the present disclosure may be included in a different refrigerant cycle apparatus such as a refrigerator, a freezer, a hot-water supplier, or a floor heater.

As depicted in FIG. 1, the air conditioner 1 principally includes an outdoor unit 2, an indoor unit 9, a liquid-refrigerant connection pipe 4, a gas-refrigerant connection pipe 5, and a control unit 3 configured to control devices constituting the outdoor unit 2 and the indoor unit 9. The liquid-refrigerant connection pipe 4 and the gas-refrigerant connection pipe 5 are refrigerant connection pipes connecting the outdoor unit 2 and the indoor unit 9. The outdoor unit 2 and the indoor unit 9 are connected via the liquid-refrigerant connection pipe 4 and the gas-refrigerant connection pipe 5 to constitute a refrigerant circuit 6 in the air conditioner 1.

The air conditioner 1 depicted in FIG. 1 includes one indoor unit 9. The air conditioner 1 may alternatively include a plurality of indoor units 9 connected parallelly to the outdoor unit 2 by the liquid-refrigerant connection pipe 4 and the gas-refrigerant connection pipe 5. The air conditioner 1 may still alternatively include a plurality of outdoor units 2. Still alternatively, the air conditioner 1 may be of an integral type including the outdoor unit 2 and the indoor unit 9 that are formed integrally with each other.

(1-1) Outdoor Unit

The outdoor unit 2 is disposed outside the air conditioning target space, such as on a roof of a building or adjacent to a wall surface of a building.

The outdoor unit 2 principally includes an accumulator 7, a compressor 8, a four-way switching valve 10, the outdoor heat exchanger 11, an expansion mechanism 12, a liquid-side shutoff valve 13, a gas-side shutoff valve 14, and an outdoor fan 16 (see FIG. 1).

The outdoor unit 2 principally includes, as a refrigerant pie connecting various devices constituting the refrigerant circuit 6, a suction pipe 17, a discharge pipe 18, a first gas refrigerant pipe 19, a liquid refrigerant pipe 20, and a second gas refrigerant pipe 21 (see FIG. 1). The suction pipe 17 connects the four-way switching valve 10 and a suction side of the compressor 8. The suction pipe 17 is provided with the accumulator 7. The discharge pipe 18 connects a discharge side of the compressor 8 and the four-way switching valve 10. The first gas refrigerant pipe 19 connects the four-way switching valve 10 and a gas side of the outdoor heat exchanger 11. The liquid refrigerant pipe 20 connects a liquid side of the outdoor heat exchanger 11 and the liquid-side shutoff valve 13. The liquid refrigerant pipe 20 is provided with the expansion mechanism 12. The second gas refrigerant pipe 21 connects the four-way switching valve 10 and the gas-side shutoff valve 14.

The compressor 8 is configured to suck a low-pressure refrigerant in the refrigeration cycle from the suction pipe 17, compresses the refrigerant by means of a compression mechanism (not depicted), and discharge the compressed refrigerant to the discharge pipe 18.

The four-way switching valve 10 is a mechanism configured to switch a refrigerant flow direction to change a state of the refrigerant circuit 6 between a cooling operation state and a heating operation state. While the refrigerant circuit 6 is in the cooling operation state, the outdoor heat exchanger 11 functions as a refrigerant radiator (condenser) and an indoor heat exchanger 91 functions as a refrigerant evaporator. While the refrigerant circuit 6 is in the heating operation state, the outdoor heat exchanger 11 functions as a refrigerant evaporator and the indoor heat exchanger 91 functions as a refrigerant condenser. When the four-way switching valve 10 brings the state of the refrigerant circuit 6 into the cooling operation state, the four-way switching valve 10 causes the suction pipe 17 to communicate with the second gas refrigerant pipe 21 and causes the discharge pipe 18 to communicate with the first gas refrigerant pipe 19 (see solid lines in the four-way switching valve 10 in FIG. 1). When the four-way switching valve 10 brings the state of the refrigerant circuit 6 into the heating operation state, the four-way switching valve 10 causes the suction pipe 17 to communicate with the first gas refrigerant pipe 19 and causes the discharge pipe 18 to communicate with the second gas refrigerant pipe 21 (see broken lines in the four-way switching valve 10 in FIG. 1).

The outdoor heat exchanger 11 (exemplifying a heat exchanger) is configured to cause heat exchange between a refrigerant flowing inside and air (heat source air) at an installation site of the outdoor unit 2. The outdoor heat exchanger 11 will be described in detail later.

The expansion mechanism 12 is disposed between the outdoor heat exchanger 11 and the indoor heat exchanger 91 on the refrigerant circuit 6. The expansion mechanism 12 according to one or more embodiments is disposed on the liquid refrigerant pipe 20 between the outdoor heat exchanger 11 and the liquid-side shutoff valve 13. The expansion mechanism 12 is provided at the outdoor unit 2 in the air conditioner 1 according to one or more embodiments. The expansion mechanism 12 may alternatively be provided at the indoor unit 9 to be described later. The expansion mechanism 12 is configured to adjust pressure and a flow rate of a refrigerant flowing in the liquid refrigerant pipe 20. The expansion mechanism 12 according to one or more embodiments is an electronic expansion valve having a variable opening degree. Alternatively, the expansion mechanism 12 may be a temperature sensitive cylinder expansion valve or a capillary tube.

The accumulator 7 is a vessel having a gas-liquid separation function of separating a received refrigerant into a gas refrigerant and a liquid refrigerant. The accumulator 7 is also a vessel having a function of reserving an excessive refrigerant generated due to operation load change or the like.

The liquid-side shutoff valve 13 is provided at a connecting portion between the liquid refrigerant pipe 20 and the liquid-refrigerant connection pipe 4. The gas-side shutoff valve 14 is provided at a connecting portion between the second gas refrigerant pipe 21 and the gas-refrigerant connection pipe 5. The liquid-side shutoff valve 13 and the gas-side shutoff valve 14 are opened while the air conditioner 1 is in operation.

The outdoor fan 16 is configured to suck outside heat source air into a casing (not depicted) of the outdoor unit 2 and supply the outdoor heat exchanger 11 with the heat source air, and to discharge air having exchanged heat with a refrigerant in the outdoor heat exchanger 11 from the casing of the outdoor unit 2. Examples of the outdoor fan 16 include a propeller fan.

(1-2) Indoor Unit

The indoor unit 9 is disposed in the air conditioning target space. The indoor unit 9 is, for example, of a ceiling embedded type. Alternatively, the indoor unit may be of a ceiling pendant type, a wall mounted type, or a floor-standing type. The indoor unit 9 may alternatively be disposed outside the air conditioning target space. For example, the indoor unit 9 may be installed in an attic space, a machine chamber, or a garage. In such a case, there is disposed an air passage for supply, from the indoor unit 9 to the air conditioning target space, of air having exchanged heat with a refrigerant in the indoor heat exchanger 91. Examples of the air passage include a duct.

The indoor unit 9 principally includes the indoor heat exchanger 91 and an indoor fan 92 (see FIG. 1).

The indoor heat exchanger 91 causes heat exchange between a refrigerant flowing in the indoor heat exchanger 91 and air in the air conditioning target space. The indoor heat exchanger 91 should not be limited in terms of its type, and is exemplarily a fin-and-tube heat exchanger including a plurality of heat transfer tubes and a plurality of fins (not depicted). The indoor heat exchanger 91 has a first end connected to the liquid-refrigerant connection pipe 4 via a refrigerant pipe. The indoor heat exchanger 91 has a second end connected to the gas-refrigerant connection pipe 5 via a refrigerant pipe.

The indoor fan 92 is a mechanism configured to suck air in the air conditioning target space into a casing (not depicted) of the indoor unit 9 and supply the indoor heat exchanger 91 with the air, and to blow, into the air conditioning target space, air having exchanged heat with a refrigerant in the indoor heat exchanger 91. Examples of the indoor fan 92 include a turbo fan. The indoor fan 92 should not be limited to the turbo fan but may be appropriately selected in terms of its type.

(1-3) Control Unit

The control unit 3 is a functional unit configured to control operation of various devices constituting the air conditioner 1.

The control unit 3 is exemplarily constituted such that an outdoor control unit (not depicted) of the outdoor unit 2 and an indoor control unit (not depicted) of the indoor unit 9 are communicably connected via a transmission line (not depicted). Each of the outdoor control unit and the indoor control unit exemplarily includes a microcomputer, and a memory or the like storing various programs for control of the air conditioner 1 and executed by the microcomputer. FIG. 1 depicts, for convenience, the control unit 3 distant from the outdoor unit 2 and the indoor unit 9.

The control unit 3 has a function that does not need to be implemented by cooperation of the outdoor control unit and the indoor control unit. For example, the function of the control unit 3 may be implemented by one of the outdoor control unit and the indoor control unit, or may be implemented partially or entirely by a control device (not depicted) different from the outdoor control unit and the indoor control unit.

As depicted in FIG. 1, the control unit 3 is electrically connected to various devices of the outdoor unit 2 and the indoor unit 9, including the compressor 8, the four-way switching valve 10, the expansion mechanism 12, the outdoor fan 16, and the indoor fan 92. The control unit 3 is also electrically connected to various sensors (not depicted) provided at the outdoor unit 2 and the indoor unit 9. The control unit 3 is configured to be communicable with a remote controller (not depicted) that is operated by a user of the air conditioner 1.

The control unit 3 operates and stops the air conditioner 1, and controls operation of the various devices constituting the air conditioner 1, in accordance with measurement signals from the various sensors, a command received from the remote controller (not depicted), and the like.

(2) CONFIGURATION OF OUTDOOR HEAT EXCHANGER

The outdoor heat exchanger 11 will be described in terms of its configuration with reference to the drawings.

Figure 2:
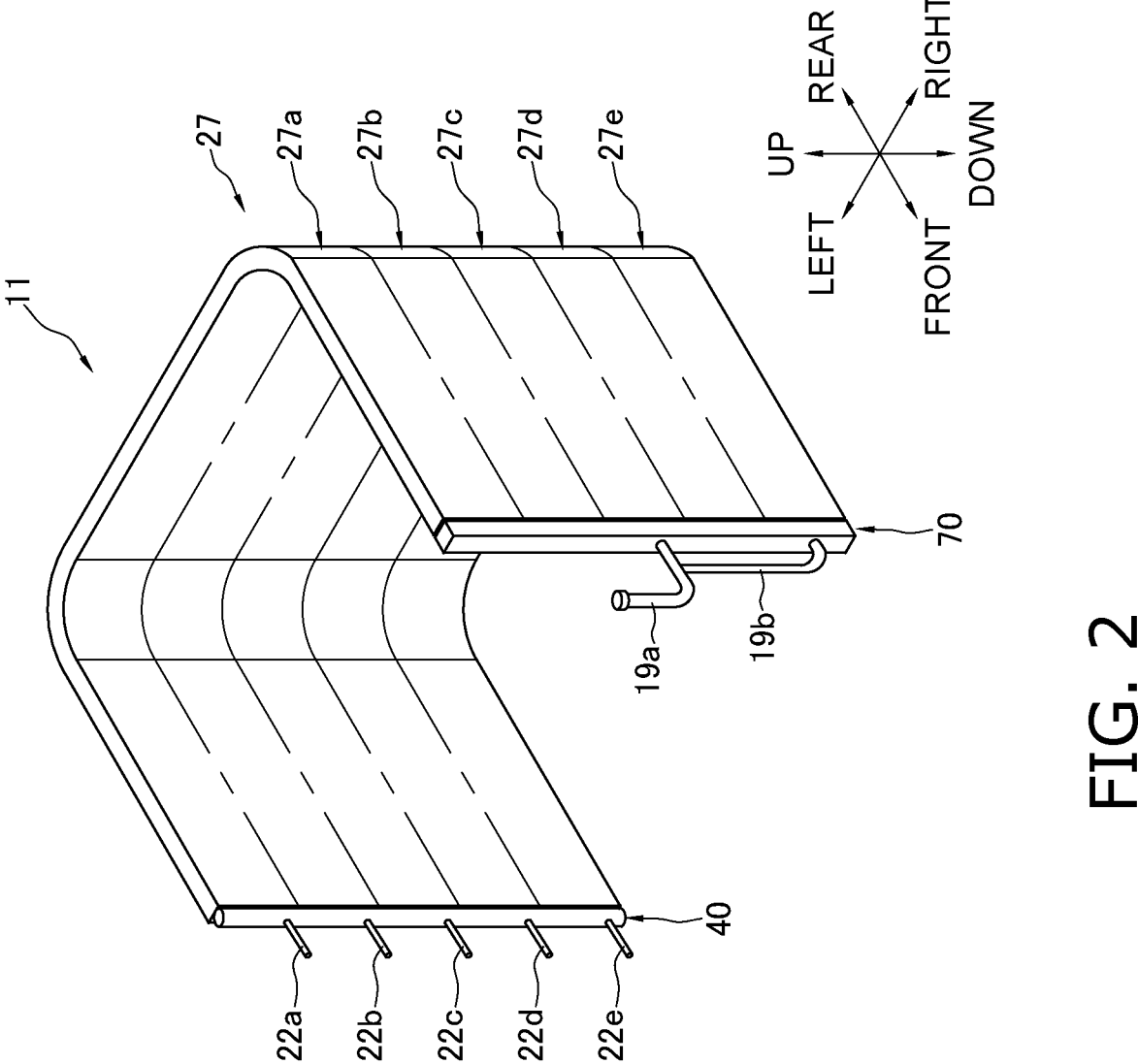
FIG. 2 is a schematic perspective view of an outdoor heat exchanger.
Figure 3:
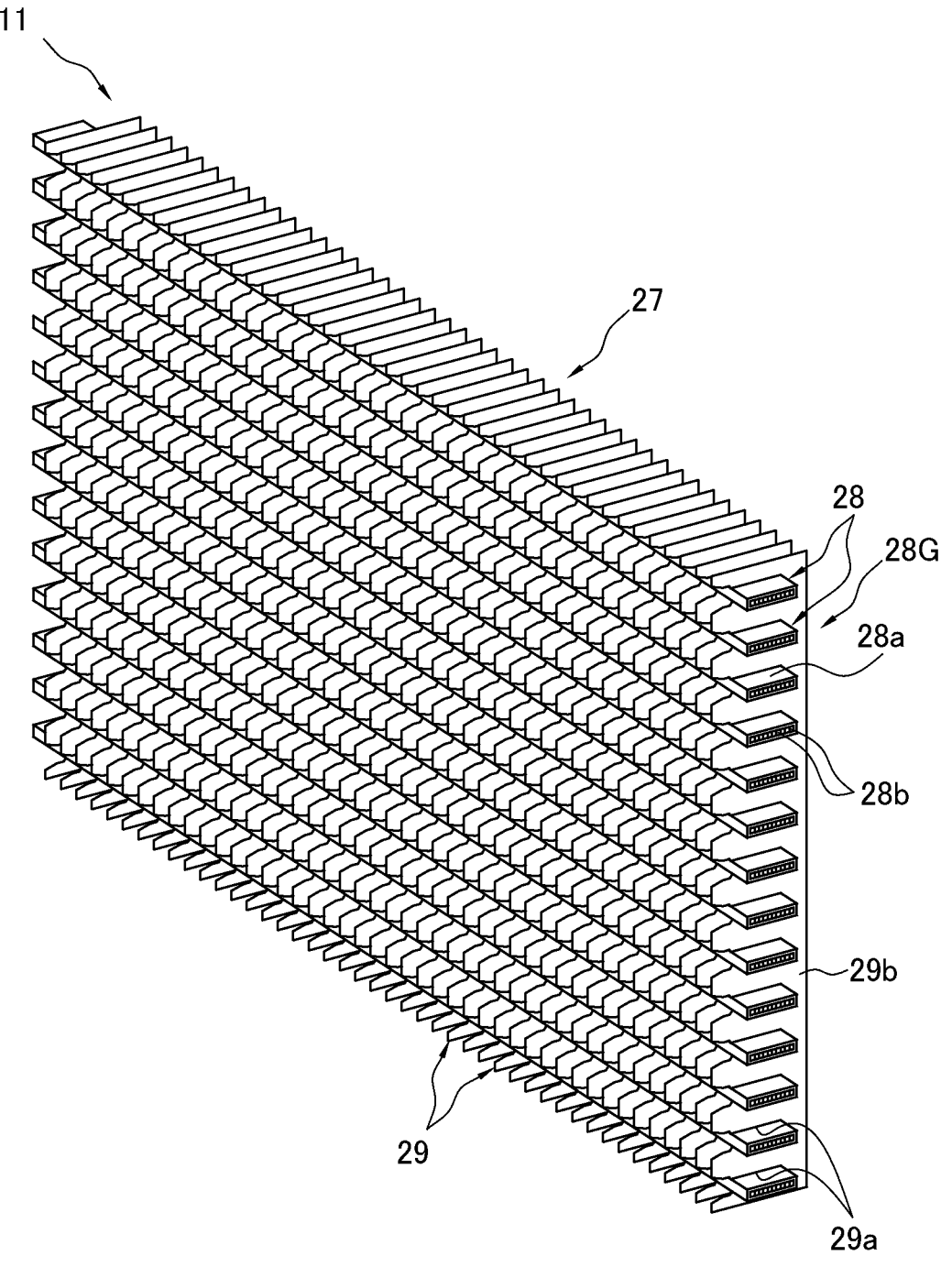
FIG. 3 is a partial enlarged view of a heat exchange unit included in the outdoor heat exchanger.
Figure 4:
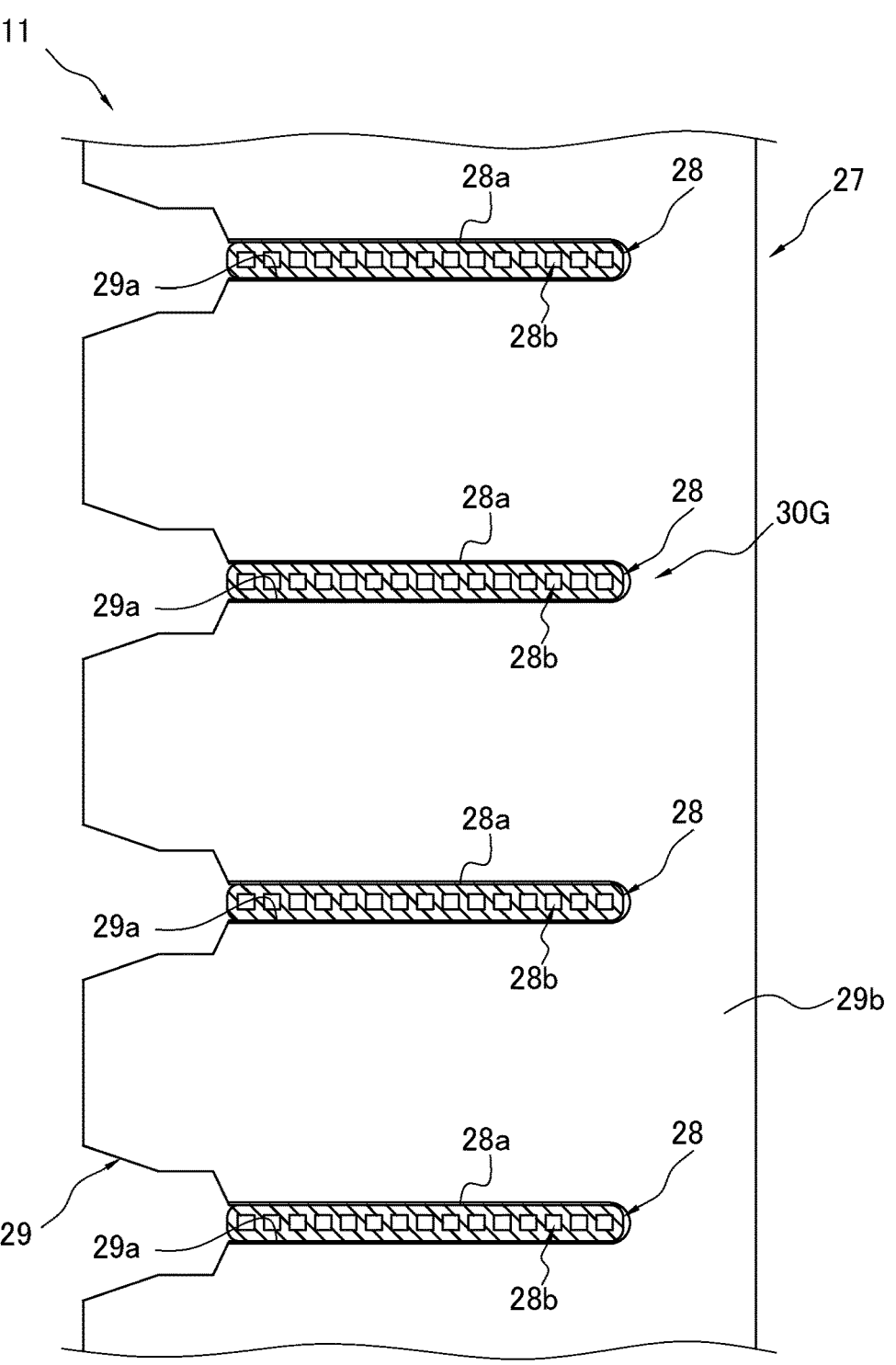
FIG. 4 is a schematic view depicting attachment states of heat transfer fins to flat tubes in the heat exchange unit.
Figure 5:
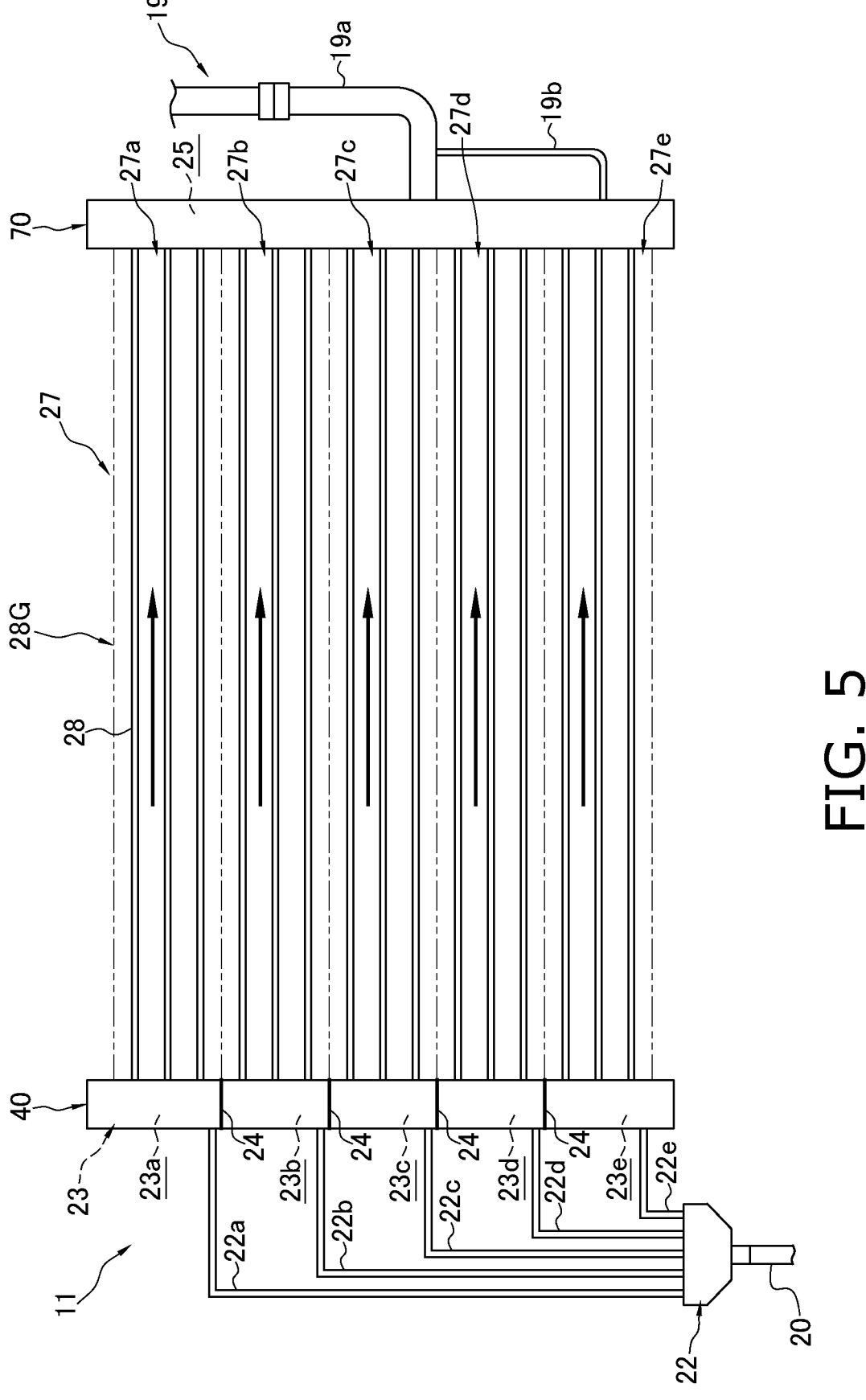
FIG. 5 is an explanatory view depicting how a refrigerant flows in the outdoor heat exchanger functioning as a refrigerant evaporator.

FIG. 2 is a schematic perspective view of the outdoor heat exchanger 11. FIG. 3 is a partial enlarged view of a heat exchange unit 27 to be described later, in the outdoor heat exchanger 11. FIG. 4 is a schematic view depicting attachment states of fins 29 to be described later, to flat tubes 28 in the heat exchange unit 27. FIG. 5 is a schematic configuration diagram of the outdoor heat exchanger 11. FIG. 5 includes arrows in the heat exchange unit 27, indicating refrigerant flows during heating operation (when the outdoor heat exchanger 11 functions as an evaporator).

The following description may include expressions such as "up", "down", "left", "right", "front (before)", and "rear (behind)", for indication of directions and positions. These expressions follow directions of arrows included in FIG. 2, unless otherwise specified. These expressions describing the directions and the positions are adopted for convenience of description. Unless otherwise specified, such expressions will not limit directions and positions of the entire outdoor heat exchanger 11 and various constituents of the outdoor heat exchanger 11 to the directions and the positions being described.

The outdoor heat exchanger 11 is configured to cause heat exchange between a refrigerant flowing inside and air.

The outdoor heat exchanger 11 principally includes a flow divider 22, a flat tube group 28G including a plurality of flat tubes 28, a plurality of fins 29, and a liquid header 40 and a gas header 70 (exemplifying headers) (see FIG. 4 and FIG. 5). Each one of the flow divider 22, the flat tubes 28, the fins 29, the liquid header 40, and the gas header 70 is made of aluminum or an aluminum alloy.

As to be described later, the flat tubes 28 and the fins 29 fixing the flat tubes 28 constitute the heat exchange unit 27 (see FIG. 2 and FIG. 3). The outdoor heat exchanger 11 includes rather the heat exchange unit 27 in a single row than the plurality of flat tubes 28 aligned in an air flow direction. When air flows in air ducts constituted by the flat tubes 28 and the fins 29 of the heat exchange unit 27, the outdoor heat exchanger 11 causes heat exchange between a refrigerant flowing in the flat tubes 28 and the air flowing in the air ducts. The heat exchange unit 27 is divided into a first heat exchange portion 27a, a second heat exchange portion 27b, a third heat exchange portion 27c, a fourth heat exchange portion 27d, and a fifth heat exchange portion 27e, which are aligned vertically (see FIG. 2).

(2-1) Flow Divider

The flow divider 22 is a mechanism configured to distribute a refrigerant. The flow divider 22 is also a mechanism configured to merge refrigerants. The flow divider 22 is connected with the liquid refrigerant pipe 20. The flow divider 22 includes a plurality of branching pipes 22a to 22e. The flow divider 22 has a function of distributing, into the plurality of branching pipes 22a to 22e, a refrigerant flowing into the flow divider 22 from the liquid refrigerant pipe 20, and guiding the refrigerant into a plurality of spaces provided in the liquid header 40. The flow divider 22 further has a function of merging refrigerants flowing from the liquid header 40 through the branching pipes 22a to 22e and guiding the refrigerants to the liquid refrigerant pipe 20.

(2-2) Flat Tube Group

The flat tube group 28G exemplifies a heat transfer tube group. The flat tube group 28G includes, as a plurality of heat transfer tubes, the plurality of flat tubes 28 (exemplifying heat transfer tubes). As depicted in FIG. 3, the flat tubes 28 are flat heat transfer tubes each having upper and lower flat surfaces 28a functioning as heat transfer surfaces. As in FIG. 3, each of the flat tubes 28 is provided with a plurality of refrigerant passages 28b allowing refrigerants to flow. Examples of the flat tubes 28 include a flat porous tube provided with a large number of refrigerant passages 28b each having a small sectional area of a passage allowing a refrigerant to flow. The plurality of refrigerant passages 28b according to one or more embodiments are aligned in the air flow direction. The flat tube 28 has a section vertical to the refrigerant passages 28b and having a maximum width that may be 70% or more, or 85% or more, of an outer diameter of a main gas refrigerant pipe connecting portion 19a.

As depicted in FIG. 5, the outdoor heat exchanger 11 includes the flat tubes 28 that extend horizontally between the liquid header 40 and the gas header 70 and are aligned vertically to form a plurality of columns. In one or more embodiments, each of the flat tubes 28 extending between the liquid header 40 and the gas header 70 is bent at two portions, such that the heat exchange unit 27 constituted by the flat tubes 28 has a substantially U shape in a planar view (see FIG. 2). The flat tubes 28 extend in an anteroposterior direction (exemplifying a first direction) at portions connected to the gas header 70, and extend in the anteroposterior direction at portions connected to the liquid header 40. The plurality of flat tubes 28 according to one or more embodiments is disposed to be constantly spaced apart in the vertical direction.

(2-3) Fin

The plurality of fins 29 are members provided for increasing a heat transfer area of the outdoor heat exchanger 11. The fins 29 are plate-shaped member extending along the columns of the flat tubes 28. The outdoor heat exchanger 11 is used in a state where the plurality of flat tubes 28 extending horizontally is aligned vertically. The fins 29 extend vertically in a state where the outdoor heat exchanger 11 is installed in the outdoor unit 2.

The fins 29 are provided with a plurality of cut-away parts 29a extending in a direction of inserting the flat tubes 28 as depicted in FIG. 4, to receive the plurality of flat tubes 28. The cut-away parts 29a extend in an extending direction of the fins 29, and in a direction perpendicular to a thickness direction of the fins 29. The cut-away parts 29a provided at the fins 29 extend horizontally in the state where the outdoor heat exchanger 11 is installed in the outdoor unit 2. The cut-away parts 29a of the fins 29 substantially match an outline of the section of the flat tube 28. The cut-away parts 29a are provided at the fins 29 so as to be spaced apart correspondingly to spaces of the aligned flat tubes 28. In the outdoor heat exchanger 11, the plurality of fins 29 is aligned in an extending direction of the flat tubes 28. When the flat tubes 28 are inserted correspondingly to the plurality of 29a of the plurality of fins 29, spaces between the flat tubes 28 adjacent to each other are divided into a plurality of air ducts allowing air to flow.

The fins 29 have connective portions 29b connected vertically and positioned upstream or downstream of the flat tubes 28 in the air flow direction. The connective portions 29b of the fins 29 are positioned upstream of the flat tubes 28 in one or more embodiments.

(2-4) Gas Header and Liquid Header

The liquid header 40 and the gas header 70 are hollow members.

As depicted in FIG. 5, the liquid header 40 is connected with first ends of the flat tubes 28, and the gas header 70 is connected with second ends of the flat tubes 28. The outdoor heat exchanger 11 is disposed in the casing (not depicted) of the outdoor unit 2 such that the liquid header 40 and the gas header 70 having substantially columnar shapes have axial directions substantially matching the vertical direction. The heat exchange unit 27 of the outdoor heat exchanger 11 according to one or more embodiments has the U shape in a planar view as depicted in FIG. 2. The liquid header 40 is disposed adjacent to a front left corner of the casing (not depicted) of the outdoor unit 2 (see FIG. 2). The gas header 70 is disposed adjacent to a front right corner of the casing (not depicted) of the outdoor unit 2 (see FIG. 2).

(2-4-1) Liquid Header

The liquid header 40 has a longitudinal direction matching the vertical direction.

The liquid header 40 has a liquid side internal space 23 divided into a plurality of sub spaces 23*a* to 23*e* by a plurality of partition plates 24 (see FIG. 5).

The plurality of sub spaces 23*a* to 23*e* is aligned vertically. The sub spaces 23*a* to 23*e* are partitioned by the partition plates 24 so as not to be communicable with each other in the liquid side internal space 23 of the liquid header 40.

The sub spaces 23*a* to 23*e* are connected, one by one, with the branching pipes 22*a* to 22*e* included in the flow divider 22. During cooling operation, refrigerants reaching the sub spaces 23*a* to 23*e* flow in the branching pipes 22*a* to 22*e* to be merged at the flow divider 22. During heating operation, refrigerants divided by the flow divider 22 are supplied to the sub spaces 23*a* to 23*e*.

(2-4-2) Gas Header

The gas header 70 has a longitudinal direction matching the vertical direction (exemplifying a second direction).

The gas header 70 has a single internal space. The gas header 70 has a gas side internal space 25 provided with no partition plates partitioning vertically aligned spaces as in the liquid header 40.

The gas header 70 is connected with the main gas refrigerant pipe connecting portion 19*a* and a branch gas refrigerant pipe connecting portion 19*b* constituting ends adjacent to the gas header 70, of the first gas refrigerant pipe 19 (see FIG. 5). Though not limited, the outer diameter of the main gas refrigerant pipe connecting portion 19*a* may be, for example, three times or more or five times or more, of an outer diameter of the branch gas refrigerant pipe connecting portion 19*b*.

The main gas refrigerant pipe connecting portion 19*a* has a first end connected to the gas header 70 so as to communicate with the gas side internal space 25 at an intermediate position in a height direction of the gas header 70.

The branch gas refrigerant pipe connecting portion 19*b* has a first end connected to the gas header 70 so as to communicate with the gas side internal space 25 at a position adjacent to a lower end in the height direction of the gas header 70. The branch gas refrigerant pipe connecting portion 19*b* has a second end connected to the main gas refrigerant pipe connecting portion 19*a*. The branch gas refrigerant pipe connecting portion 19*b* is smaller in inner diameter than the main gas refrigerant pipe connecting portion 19*a* and connected to the gas header 70 below the main gas refrigerant pipe connecting portion 19*a*, to allow refrigerating machine oil reserved adjacent to the lower end of the gas header 70 to flow into the main gas refrigerant pipe connecting portion 19*a* and return to the compressor 8.

(3) REFRIGERANT FLOW IN OUTDOOR HEAT EXCHANGER

When the air conditioner 1 executes heating operation and the outdoor heat exchanger 11 functions as a refrigerant evaporator, a refrigerant in a gas-liquid two-phase state flowing from the liquid refrigerant pipe 20 and reaching the flow divider 22 flows through the branching pipes 22*a* to 22*e* and flows into the sub spaces 23*a* to 23*e* constituting the liquid side internal space 23 of the liquid header 40. Specifically, the refrigerant flowing in the branching pipe 22*a* flows into the sub space 23*a*, the refrigerant flowing in the branching pipe 22*b* flows into the sub space 23*b*, the refrigerant flowing in the branching pipe 22*c* flows into the sub space 23*c*, the refrigerant flowing in the branching pipe 22*d* flows into the sub space 23*d*, and the refrigerant flowing in the branching pipe 22*e* flows into the sub space 23*e*, respectively. The refrigerants flowing into the sub spaces 23*a* to 23*e* of the liquid side internal space 23 flow in the flat tubes 28 connected to the sub spaces 23*a* to 23*e*. The refrigerants flowing in the flat tubes 28 exchange heat with air to be evaporated and become gas-phase refrigerants, and flow into the gas side internal space 25 of the gas header 70 to be merged.

When the air conditioner 1 executes cooling operation or frost operation, the refrigerant flows in the refrigerant circuit 6 oppositely to the case of heating operation. Specifically, a gas-phase refrigerant having high temperature flows into the gas side internal space 25 of the gas header 70 through the main gas refrigerant pipe connecting portion 19*a* and the branch gas refrigerant pipe connecting portion 19*b* of the first gas refrigerant pipe 19. The refrigerant flowing into the gas side internal space 25 of the gas header 70 are distributed to flow into the flat tubes 28. Refrigerants flowing into the flat tubes 28 passes through the flat tubes 28 and flows into the sub spaces 23*a* to 23*e* of the liquid side internal space 23 of the liquid header 40. The refrigerants flowing into the sub spaces 23*a* to 23*e* of the liquid side internal space 23 are merged by the flow divider 22 to be flow out to the liquid refrigerant pipe 20.

(4) DETAILS OF GAS HEADER

Figure 6:
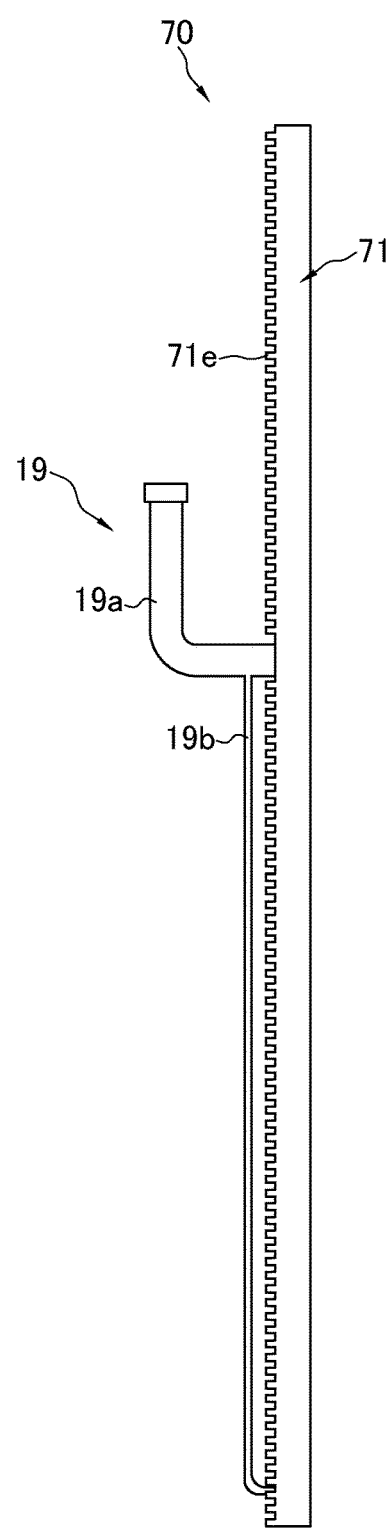
FIG. 6 is an outer appearance configuration diagram in a side view, depicting how a main gas refrigerant pipe connecting portion is connected to a gas header.
Figure 7:
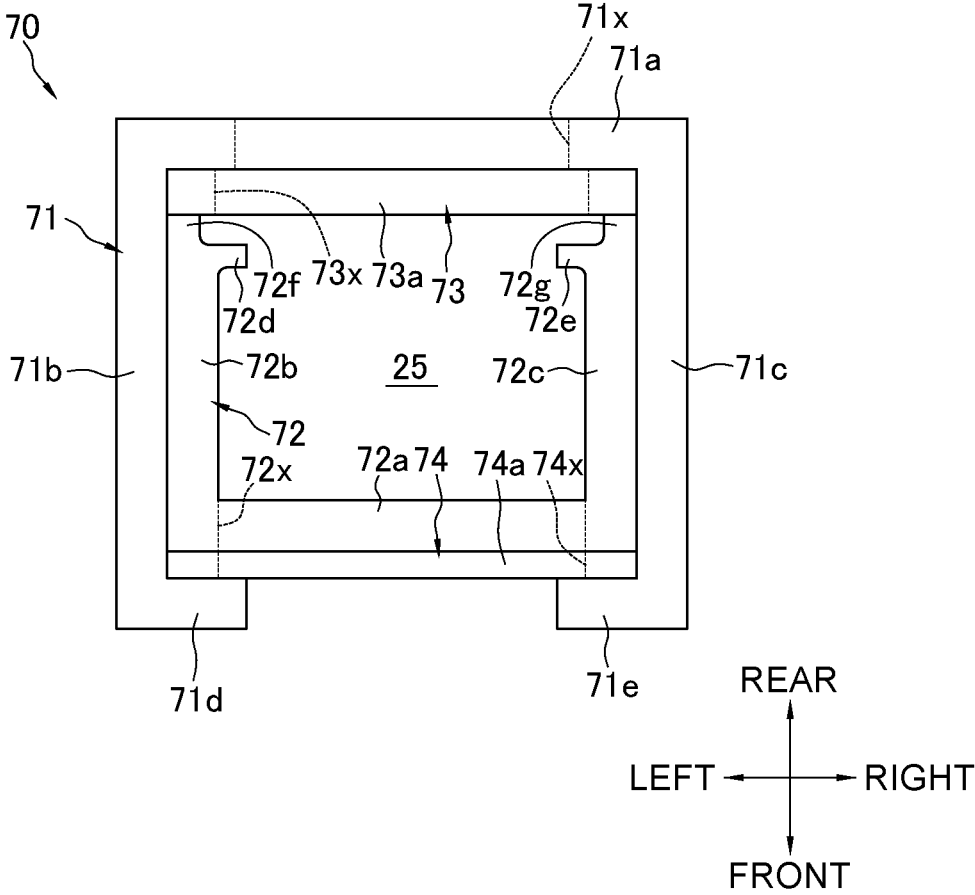
FIG. 7 is a planar sectional view of the gas header.
Figure 8:
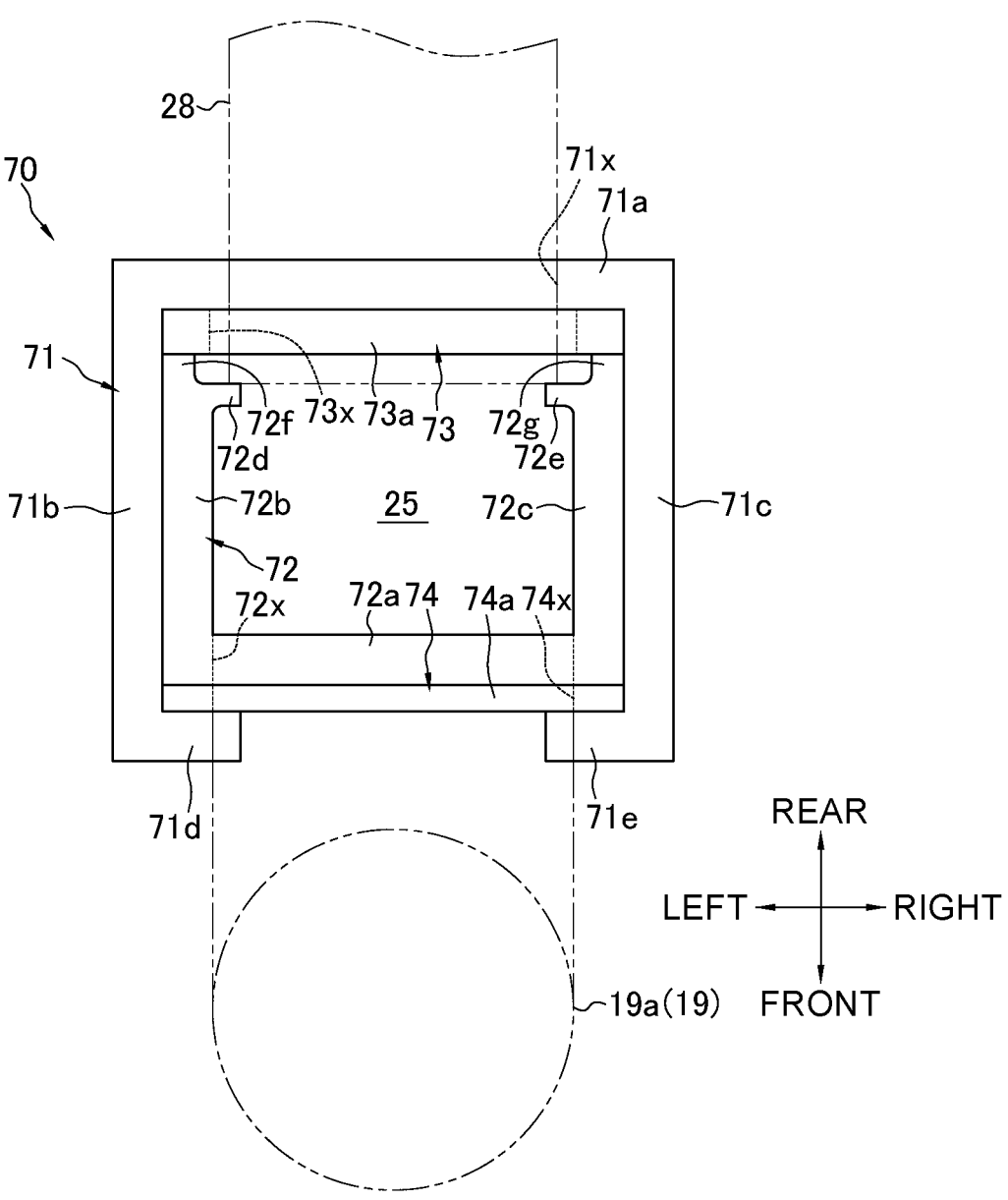
FIG. 8 is a planar sectional view depicting how the main gas refrigerant pipe connecting portion and a flat tube are connected to the gas header.

FIG. 6 is an outer appearance configuration diagram in a side view, depicting how the main gas refrigerant pipe connecting portion 19*a* is connected to the gas header 70. FIG. 7 is a planar sectional view of the gas header 70. FIG. 8 is a planar sectional view depicting how the main gas refrigerant pipe connecting portion 19*a* and the flat tube 28 are connected to the gas header 70.

Figure 9:
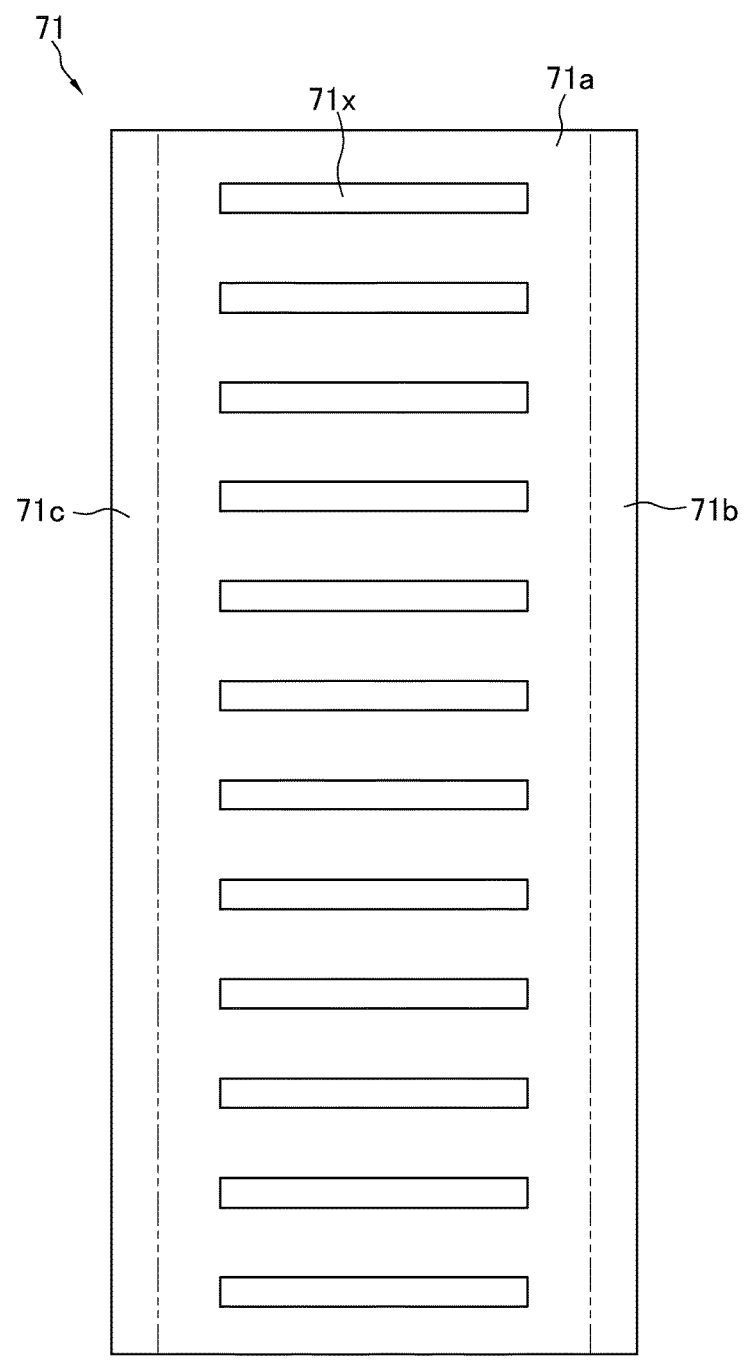
FIG. 9 is a schematic view from behind, of a first member.
Figure 10:
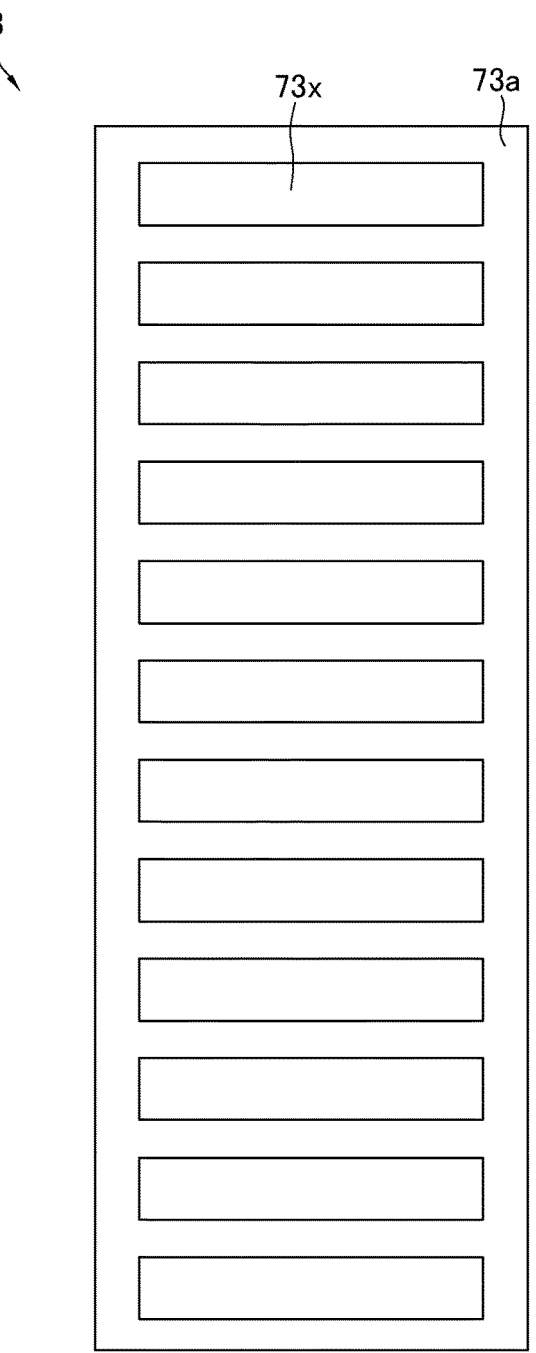
FIG. 10 is a schematic view from behind, of a third member.
Figure 11:
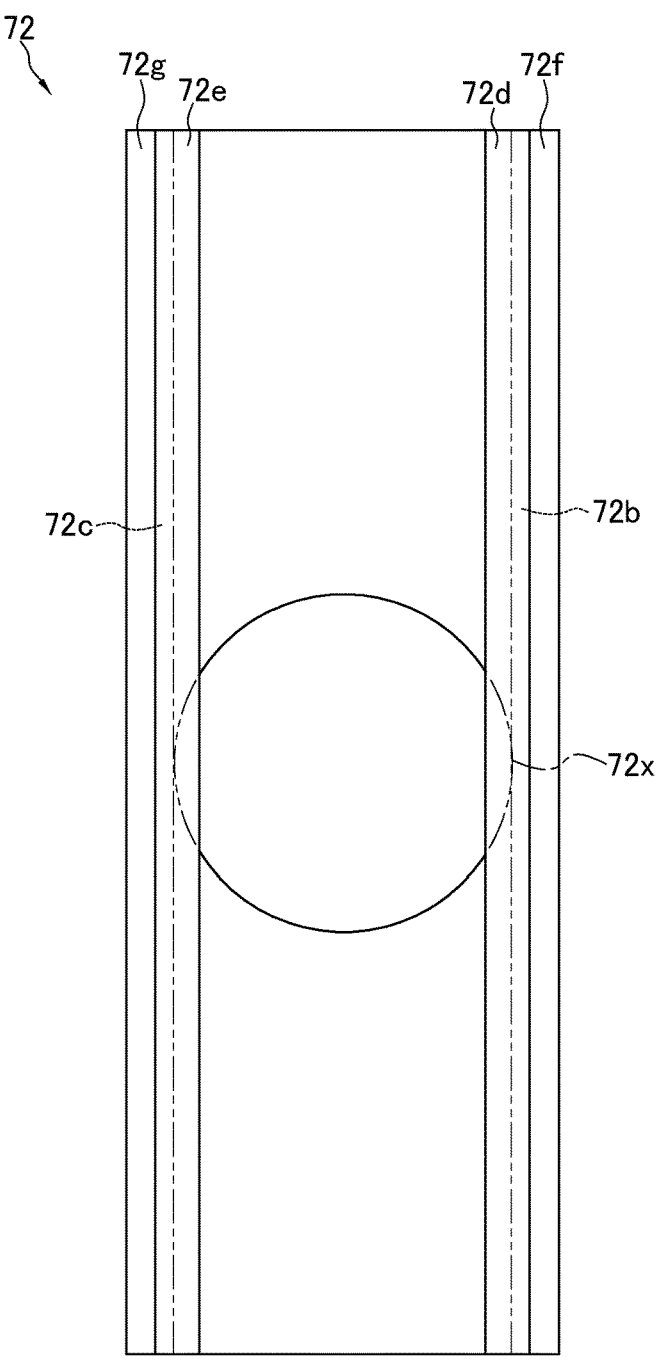
FIG. 11 is a schematic view from behind, of a second member.
Figure 12:
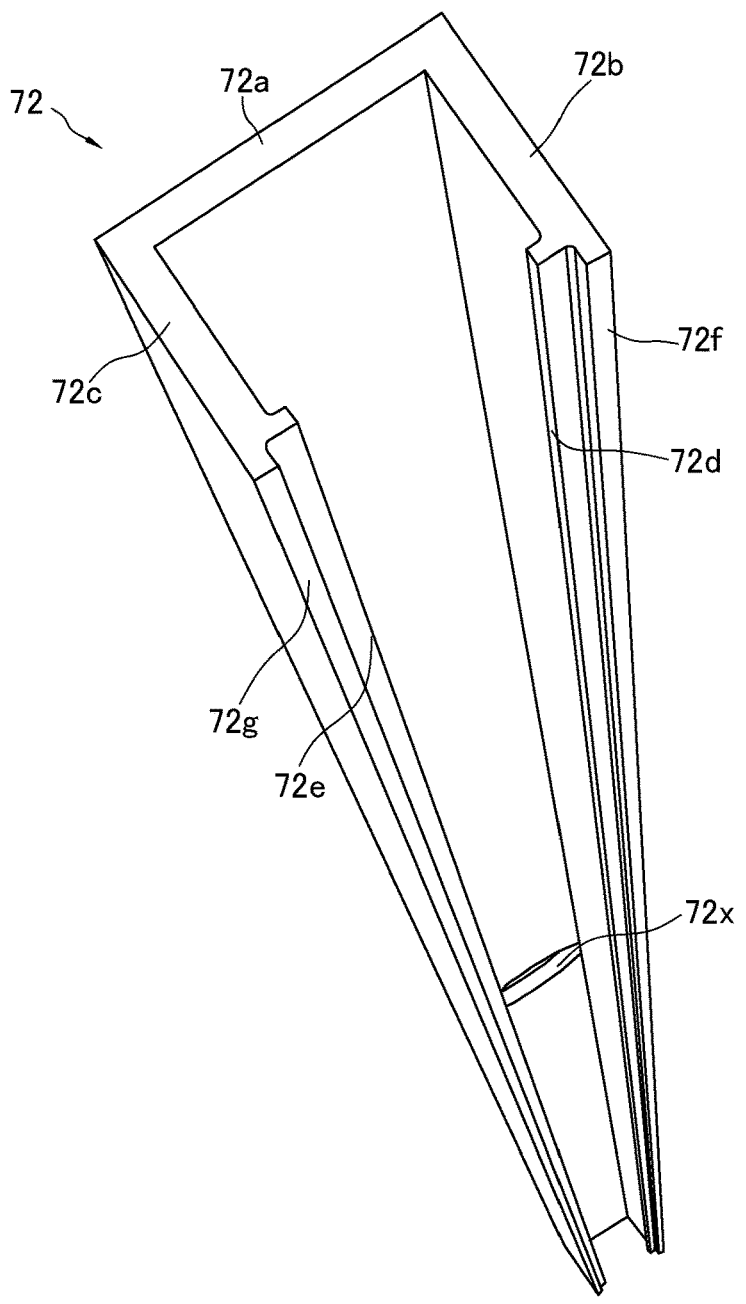
FIG. 12 is an outer appearance perspective view of the second member.
Figure 13:
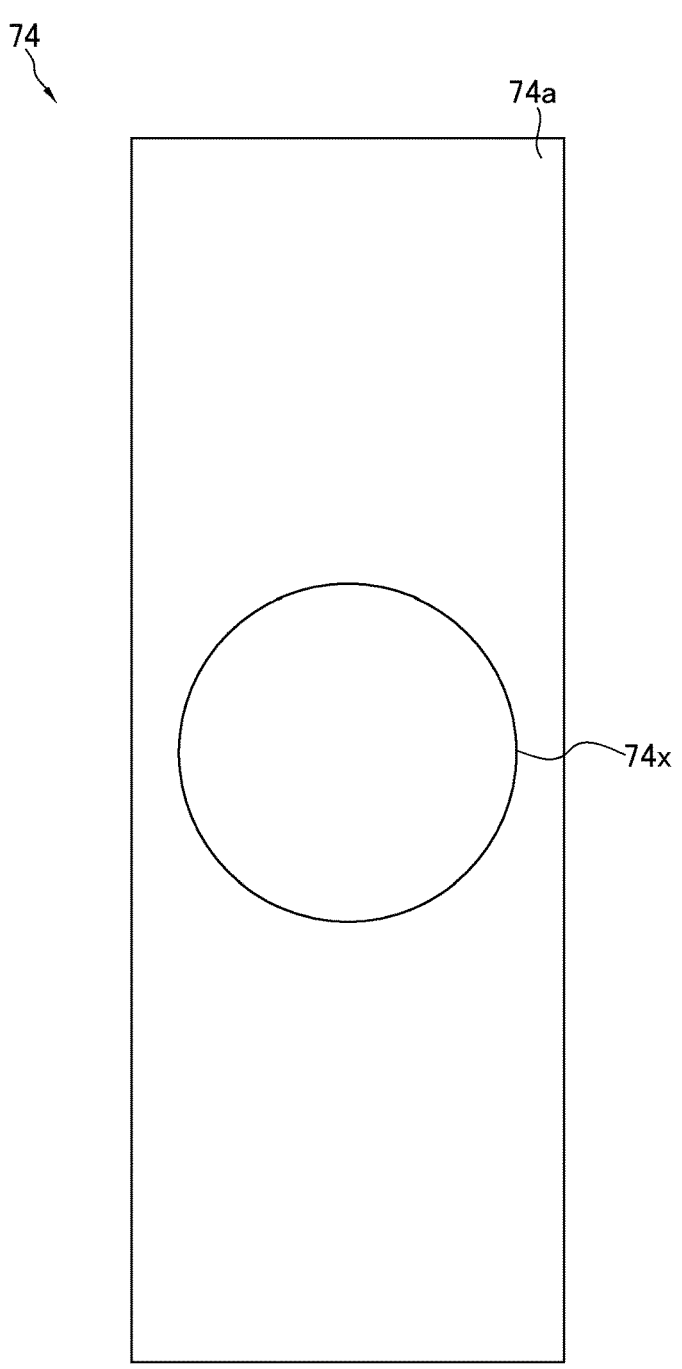
FIG. 13 is a schematic view from behind, of a fourth member.
Figure 14:
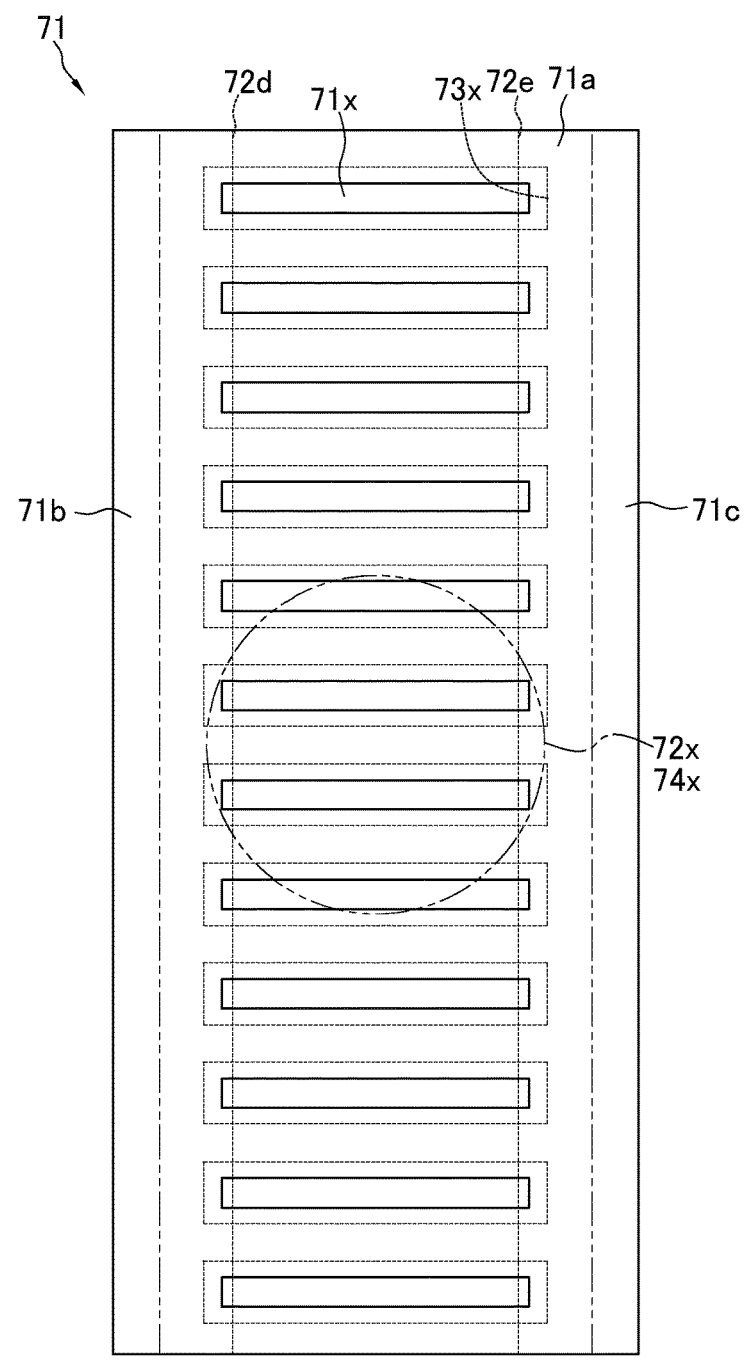
FIG. 14 is a projection view depicting positional relationship of openings in a case where the first member is viewed from behind.

FIG. 9 is a schematic view from behind, of a first member 71. FIG. 10 is a schematic view from behind, of a third member 73. FIG. 11 is a schematic view from behind, of a second member 72. FIG. 13 is a schematic view from behind, of a fourth member 74. FIG. 14 is a projection view depicting positional relationship of openings in a case where the first member 71 is viewed from behind.

Figure 15:
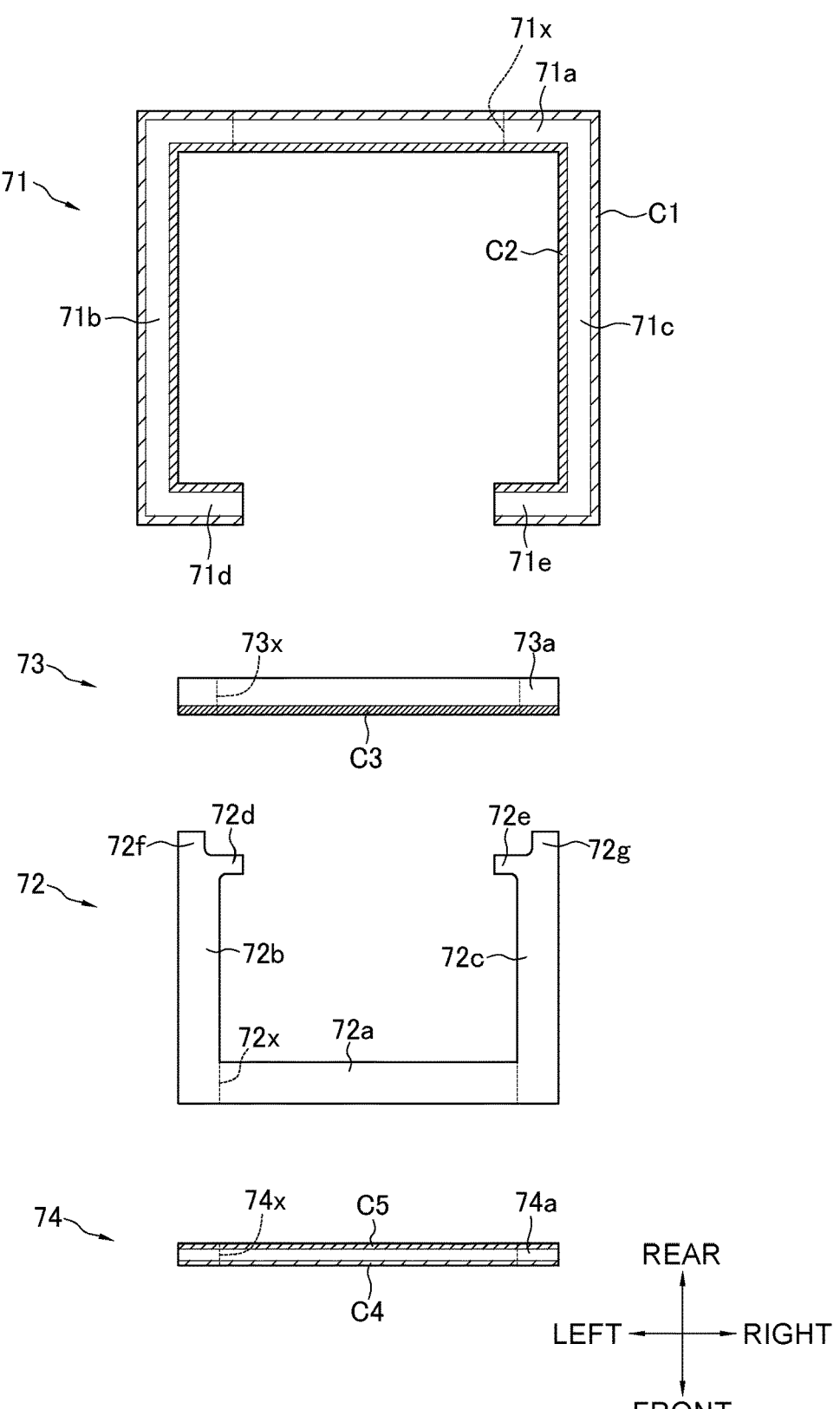
FIG. 15 is an exploded planar sectional view of clad layers in members of the gas header.

FIG. 15 is a planar sectional view of clad layers in the first member 71, the third member 73, and the fourth member 74 constituting the gas header 70.

The gas header 70 includes the first member 71, the second member 72, the third member 73, the fourth member 74, as well as a top lid member and a bottom lid member (not depicted). The gas header 70 is constituted such that the first member 71, the second member 72, the third member 73, the fourth member 74, the top lid member, and the bottom lid member are joined by brazing.

The gas header 70 has an outline in a planar view, which has a substantially quadrilateral shape provided with one side connected with the flat tubes 28.

(4-1) First Member

The first member 71 principally constitutes a periphery of the outline of the gas header 70, along with the fourth member 74 to be described later.

The first member 71 has a clad layer C1 containing a brazing filler material and provided on a surface (outer surface) constituting a circumference of the gas header 70, of a core material made of aluminum or an aluminum alloy. The first member 71 has a clad layer C2 (exemplifying a brazing layer between the first member and the second member, or exemplifying a brazing layer between the first member and the third member) containing a brazing filler material and provided on a surface (inner surface) opposite to the surface constituting the circumference of the gas header 70, of the core material made of aluminum or an aluminum alloy. Though not limited, an exemplary member (the same applies hereinafter) provided with a clad layer may be manufactured while joining a plate-shaped clad layer to a core material by means of hot rolling. The first member 71 according to one or more embodiments can be formed through bending, at a pleat line in a longitudinal direction of the gas header 70, a single sheet metal obtained by rolling or the like. In this case, the first member 71 has a first thickness that is uniform across portions. The first thickness is preferably less than the maximum thickness of the second member 72 or a thickness of the fourth member 74, and may be equal in thickness to the third member 73. The first thickness can be exemplarily set to 1.0 mm or more and 2.0 mm or less, and is preferably 1.5 mm.

The clad layer C1 constitutes the outer surface of the gas header 70, and thus contains the brazing filler material as well as a sacrificial anodic material having corrosion resistance. Examples of the sacrificial anodic material include zinc or an alloy containing zinc. The clad layer C1 contains silicon having a content that can be exemplarily set to 6.8 percent by weight or more and 8.2 percent by weight or less. The clad layer C1 contains an Al—Si alloy having a content that can be exemplarily set to 6.8 percent by weight or more and 8.2 percent by weight or less. Examples of the clad layer C1 include an alloy having A4N43 as an alloy number prescribed by the Japanese Industrial Standards for aluminum.

The clad layer C2 constitutes the inner surface of the gas header 70, and thus needs no corrosion resistance. The clad layer C2 contains silicon having a content that may be equal to or different from the content of the clad layer C1, and can be exemplarily set to 6.8 percent by weight or more and 8.2 percent by weight or less. The clad layer C2 contains an Al—Si alloy having a content that can be exemplarily set to 6.8 percent by weight or more and 8.2 percent by weight or less. Examples of the clad layer C2 include an alloy having A4343 as an alloy number prescribed by the Japanese Industrial Standards for aluminum.

The first member 71 includes a flat tube connection plate 71a, a first outer wall 71b, a second outer wall 71c, a first claw 71d, and a second claw 71e.

The flat tube connection plate 71a (exemplifying a first portion) is a flat plate portion expanding vertically and transversely. The flat tube connection plate 71a is provided with a plurality of flat tube connection openings 71x (exemplifying openings) aligned vertically. The flat tube connection openings 71x penetrate the flat tube connection plate 71a in its thickness direction. In a state where the flat tubes 28 are inserted to the flat tube connection openings 71x such that first ends of the flat tubes 28 completely pass therethrough, the flat tubes 28 are joined by brazing. In such a state where the flat tubes 28 are joined by brazing, an entire inner circumferential surface of each of the flat tube connection openings 71x is in contact with an entire outer circumferential surface of a corresponding one of the flat tubes 28. The first thickness of the first member 71 including the flat tube connection plate 71a is set relatively small such as about 1.0 mm or more and 2.0 mm or less, and the inner circumferential surfaces of the flat tube connection openings 71x can thus have small length in a thickness direction. When the flat tubes 28 are inserted to the flat tube connection openings 71x prior to joining by brazing, the inner circumferential surface of each of the flat tube connection openings 71x and the outer circumferential surface of the corresponding one of the flat tubes 28 generate less friction for facilitated insertion.

The first outer wall 71b is a planar portion extending forward from a front surface of a left (inside the outdoor unit 2 and the liquid header 40 side) end of the flat tube connection plate 71a along a first inner wall 72b to be described later.

The second outer wall 71c is a planar portion extending forward from a front surface of a right (outside the outdoor unit 2 and far from the liquid header 40) end of the flat tube connection plate 71a along a second inner wall 72c to be described later.

The first claw 71d extends rightward from a front end of the first outer wall 71b. The second claw 71e extends leftward from a front end of the second outer wall 71c.

The first claw 71d and the second claw 71e extend along and beyond the first outer wall 71b and the second outer wall 71c, respectively, before the second member 72, the third member 73, and the fourth member 74 are disposed inside the first member 71 in a planar view. In a state where the second member 72, the third member 73, and the fourth member 74 are disposed inside the first member 71 in a planar view, the first claw 71d and the second claw 71e are bent to be closer to each other such that the first member 71 caulks the second member 72, the third member 73, and the fourth member 74 so as to be fixed to each other. Brazing is executed in a furnace or the like in this state to join the members by brazing for complete fixation.

(4-2) Third Member

The third member 73 is a flat plate portion laminated to be in contact with a surface connected with the first gas refrigerant pipe 19, of the flat tube connection plate 71a of the first member 71 and expanding vertically and transversely. The third member 73 is similar in transverse length to a portion excluding the both ends of the flat tube connection plate 71a of the first member 71.

The third member 73 does not include any portion constituting the circumference of the gas header 70, but constitutes an internal portion of the gas header 70 and is positioned inside the first member 71.

The third member 73 has a clad layer C3 (exemplifying a brazing layer between the second member and the third member) containing a brazing filler material and provided on a surface (the second member 72 side surface) opposite to a surface facing the flat tube connection plate 71a of the first member 71, of a core material made of aluminum or an aluminum alloy.

The third member 73 has uniform third thickness. The third thickness is preferably less than the maximum thickness of the second member 72 or the thickness of the fourth member 74, and may be equal in thickness to the first member 71. The third thickness can be exemplarily se to 1.0 mm or more and 2.0 mm or less, and is preferably 1.5 mm.

The clad layer C3 contains silicon having a content that can be exemplarily set to 9.0 percent by weight or more and 11.0 percent by weight or less. The clad layer C3 contains an Al—Si alloy having a content that can be exemplarily set to 9.0 percent by weight or more and 11.0 percent by weight or less. Examples of the clad layer C3 include an alloy having A4045 as an alloy number prescribed by the Japanese Industrial Standards for aluminum.

Though not limited, the third member 73 may not be provided with any clad layer on the surface opposite to the surface provided with the clad layer C3, and may be preferably provided with a flux layer for removal of a surface oxide film.

The third member 73 includes an inner plate 73a and a plurality of internal openings 73x.

The inner plate 73a has a flat plate shape expanding vertically and transversely.

The plurality of internal openings 73x (exemplifying second openings) is aligned vertically and penetrates the inner plate 73a in its thickness direction.

The internal openings 73x of the third member 73 are larger than the flat tube connection openings 71x provided in the flat tube connection plate 71a of the first member 71. In the state where the third member 73 is laminated on the flat tube connection plate 71a of the first member 71, the internal openings 73x in the third member 73 have outer edges positioned outside outer edges of the flat tube connection openings 71x provided in the flat tube connection plate 71a of the first member 71 in a lamination direction of members, more specifically, in the anteroposterior direction. This configuration inhibits the brazing filler material from shifting due to a capillary phenomenon during joining by brazing and blocking the refrigerant passages 28b of each of the flat tubes 28. In view of this, the outer edges of the internal openings 73x of the third member 73 have upper and lower portions that may be distant by 2 mm or more from upper and lower portions of the outer edges of the flat tube connection openings 71x of the flat tube connection plate 71a, and are preferably distant by 3 mm or more.

The clad layer C3 of the third member 73 is positioned inside the clad layer C2 of the first member 71 in the gas header 70.

(4-3) Second Member

The second member 72 is disposed between the flat tube connection plate 71a of the first member 71 and the main gas refrigerant pipe connecting portion 19a in the anteroposterior direction. The second member 72 has a substantially U shape in a planar view.

Inside the second member 72, more specifically, in a space surrounded with the second member 72, the third member 73, and the ends of the flat tubes 28, the gas side internal space 25 is provided.

The maximum thickness of the second member 72 is preferably more than the thickness of the first member 71. The maximum thickness of the second member 72 may be preferably 4.0 mm or less and may be more preferably 3.0 mm in view of facilitated pressing and punching.

Though not limited, the second member 72 is preferably obtained through extrusion molding in an extrusion direction matching the longitudinal direction of the gas header 70. Extrusion molding facilitates provision of portions varied in thickness. A thick sheet metal is relatively expensive. Provision of the thick second member 72 through extrusion direction leads to cost reduction. The second member 72 according to one or more embodiments, which is obtained through extrusion direction, is not provided with any clad layer containing a brazing filler material.

The second member 72 includes the first inner wall 72b, the second inner wall 72c, a coupling portion 72a, a first projection 72d, a second projection 72e, a first edge 72f, and a second edge 72g.

The coupling portion 72a is a plate-shaped portion facing a main gas refrigerant pipe connecting portion 19a side surface, of the third member 73, and expanding vertically and transversely. The coupling portion 72a is positioned in the main gas refrigerant pipe connecting portion 19a side of the gas header 70. The coupling portion 72a is provided with an internal gas pipe connection opening 72x connected with an end of the main gas refrigerant pipe connecting portion 19a and penetrating the coupling portion 72a in its thickness direction. The coupling portion 72a is further provided with an opening (not depicted) connected with an end of the branch gas refrigerant pipe connecting portion 19b and penetrating the coupling portion 72a in the thickness direction.

The first inner wall 72b is a planar portion extending backward toward the extending flat tubes 28, from a left (inside the outdoor unit 2 and the liquid header 40 side) end of the coupling portion 72a. The first inner wall 72b has a left surface in surface contact with a right surface of the first outer wall 71b of the first member 71.

The second inner wall 72c is a planar portion extending backward toward the extending flat tubes 28, from a right (outside the outdoor unit 2 and far from the liquid header 40) end of the coupling portion 72a. The second inner wall 72c has a right surface in surface contact with a left surface of the second outer wall 71c of the first member 71.

The first inner wall 72b and the second inner wall 72c face each other. Specifically, a front end of the first inner wall 72b and a front end of the second inner wall 72c also face each other.

The coupling portion 72a, the first inner wall 72b, and the second inner wall 72c are thicker than the first member 71, and may be thicker by 1.5 times or more and are preferably thicker by 2 times or more.

Though not limited, the first inner wall 72b and the second inner wall 72c have length in an extending direction (anteroposterior direction) of the flat tubes 28, which may be larger by three times or more and is preferably larger by five times or more than length of the coupling portion 72a in the extending direction (anteroposterior direction) of the flat tubes 28.

The coupling portion 72a couples the first inner wall 72b and the second inner wall 72c. Specifically, the coupling portion 72a couples the front end (the main gas refrigerant pipe connecting portion 19a side end) of the first inner wall 72b and the front end (the main gas refrigerant pipe connecting portion 19a side end) of the second inner wall 72c. The coupling portion 72a extends transversely (exemplifying a third direction that is preferably perpendicular to both the first direction and the second direction, and the first direction, the second direction, and the third direction are more preferably perpendicular to one another) in a planar view of the gas header 70.

The second member 72 can increase the gas side internal space 25 by simply extending the first inner wall 72b and the second inner wall 72c without adding any other member. This configuration allows a gas refrigerant to be unlikely to have pressure loss while passing through the gas side internal space 25. Although the first inner wall 72b and the second inner wall 72c extend in the extending direction of the flat tubes 28 for increasing the gas side internal space 25, the first inner wall 72b and the second inner wall 72c are coupled via the coupling portion 72a to integrate the coupling portion 72a, the first inner wall 72b, and the second inner wall 72c. This configuration can improve strength of the second member 72 and improve compressive strength of the gas header 70.

The first edge 72f is provided behind (the flat tubes 28 side) the first inner wall 72b. The first edge 72f has a left surface provided flush with the left surface of the first inner wall 72b, and is in surface contact with the right surface of the first outer wall 71b of the first member 71. The first edge 72f has a rear end in contact with a front surface of the third member 73. The first edge 72f has a thickness (transverse width) less than thickness (transverse width) of the first inner wall 72b. The first edge 72f and the front surface of the third member 73 are in contact with each other at a position displaced leftward from the flat tubes 28 and displaced leftward from left ends of the internal openings 73x of the third member 73.

The second edge 72g is provided behind (the flat tubes 28 side) the second inner wall 72c. The second edge 72g has a right surface provided flush with the right surface of the second inner wall 72c, and is in surface contact with the left surface of the second outer wall 71c of the first member 71. The second edge 72g has a rear end in contact with the front surface of the third member 73. The second edge 72g has a thickness (transverse width) less than a thickness (transverse width) of the second inner wall 72c. The second edge 72g and the front surface of the third member 73 are in contact with each other at a position displaced rightward from the flat tubes 28 and displaced rightward from right ends of the internal openings 73x of the third member 73.

In a planar view, the first edge 72f and the second edge 72g are distant from each other by length that is larger than width of the flat tubes 28, is larger than width of the flat tube connection openings 71x of the first member 71, and is larger than width of the internal openings 73x of the third member 73. Each of the first edge 72f and the second edge 72g extends from an upper end to a lower end of the gas header 70.

The first projection 72d extends rightward (toward the second inner wall 72c) from a portion in front of the first edge 72f at a rear end of the first inner wall 72b. The first projection 72d extends from the upper end to the lower end of the gas header 70. The first projection 72d has a right end displaced rightward from the left ends of the internal openings 73x of the third member 73 and displaced rightward from left ends of the flat tubes 28. The first projection 72d is positioned closer to the flat tubes 28 than an anteroposterior center of the second member 72.

The second projection 72e extends leftward (toward the first inner wall 72b) from a portion in front of the second edge 72g at a rear end of the second inner wall 72c. The second projection 72e extends from the upper end to the lower end of the gas header 70. The second projection 72e has a left end displaced leftward from the right ends of the internal openings 73x of the third member 73 and displaced leftward from right ends of the flat tubes 28. The second projection 72e is positioned closer to the flat tubes 28 than the anteroposterior center of the second member 72.

The first projection 72d and the second projection 72e have a minimum distance (transverse distance) smaller than the maximum width on the section vertical to the refrigerant passages 28b of each of the flat tubes 28. When the flat tubes 28 are inserted to the gas header 70, the first projection 72d and the second projection 72e can thus set how deep the flat tubes 28 are inserted. This configuration inhibits reduction of the gas side internal space 25 due to excessive insertion of the flat tubes 28. Furthermore, the first projection 72d and the second projection 72e can align the ends of the plurality of flat tubes 28 in the gas header 70.

(4-4) Fourth Member

The fourth member 74 is a flat plate portion laminated to be in contact with a front surface of the coupling portion 72a of the second member 72 and expanding vertically and transversely. The fourth member 74 is similar in transverse length to the third member 73, and is similar in transverse length to the portion excluding the both ends of the flat tube connection plate 71a of the first member 71.

The fourth member 74 is provided with a clad layer C4 having a surface (outer surface) constituting the circumference of the gas header 70 and containing a brazing filler material. The fourth member 74 has a clad layer C5 containing a brazing filler material and provided on a surface (inner surface) opposite to a surface constituting the circumference of the gas header 70, of a core material made of aluminum or an aluminum alloy.

The fourth member 74 has a uniform fourth thickness. The fourth thickness is preferably more than the first thickness and the third thickness, and may be equal in thickness to the first member 71. The fourth thickness is preferably 4.0 mm or less in view of facilitated pressing and punching, is preferably 2.0 mm or more in view of improvement in compressive strength, and may be more preferably 3.0 mm.

The clad layer C4 constitutes the outer surface of the gas header 70, and thus contains the brazing filler material as well as a sacrificial anodic material having corrosion resistance. Examples of the sacrificial anodic material include zinc or an alloy containing zinc. The clad layer C4 contains silicon having a content that can be exemplarily set to 6.8 percent by weight or more and 8.2 percent by weight or less. The clad layer C4 contains an Al—Si alloy having a content that can be exemplarily set to 6.8 percent by weight or more and 8.2 percent by weight or less. Examples of the clad layer C4 include an alloy having A4N43 as an alloy number prescribed by the Japanese Industrial Standards for aluminum.

The clad layer C5 constitutes the inner surface of the gas header 70, and thus needs no corrosion resistance. The clad layer C5 contains silicon having a content that may be equal to or different from the content of the clad layer C4, and can be exemplarily set to 6.8 percent by weight or more and 8.2 percent by weight or less. The clad layer C5 contains an Al—Si alloy having a content that can be exemplarily set to 6.8 percent by weight or more and 8.2 percent by weight or less. Examples of the clad layer C5 include an alloy having A4343 as an alloy number prescribed by the Japanese Industrial Standards for aluminum.

The fourth member 74 is a plate-shaped member and can thus be easily provided on the surface with a clad layer containing a brazing filler material. Even in a case where the second member 72 is not provided with any clad layer containing a brazing filler material as in an exemplary case where the second member 72 is obtained through extrusion, the second member 72 can be joined by brazing to any other member with use of the brazing filler material provided on the fourth member 74.

The fourth member 74 includes an outer plate 74a and an external gas pipe connection opening 74x.

The outer plate 74a has a flat plate shape expanding vertically and transversely.

The external gas pipe connection opening 74x is connected with the end of the main gas refrigerant pipe connecting portion 19a and penetrates the outer plate 74a in its thickness direction.

The outer plate 74a is further provided, in a lower portion, with an opening (not depicted) connected with the end of the branch gas refrigerant pipe connecting portion 19b and penetrating the outer plate 74a in the thickness direction.

The main gas refrigerant pipe connecting portion 19a and the branch gas refrigerant pipe connecting portion 19b thus communicate with an inner surface of the flat tube connection plate 71a of the first member 71 via the external gas pipe connection opening 74x, the internal gas pipe connection opening 72x, and the gas side internal space 25 interposed between the first inner wall 72b and the second inner wall 72c.

The fourth member 74 has a front surface caulked while being in contact with the first claw 71d and the second claw 71e of the first member 71.

(4-5) Brazing

The outdoor heat exchanger 11 is heated in a furnace to be brazed in a state where the plurality of flat tubes 28, the flow divider 22, the first gas refrigerant pipe 19, and the like are temporarily assembled to the liquid header 40 and the gas header 70.

When the gas header 70 is temporarily assembled, a portion of the clad layer C2 provided on the flat tube connection plate 71a of the first member 71 is made in contact with a portion of the third member 73 where the clad layer C3 is not provided, and portions of the clad layer C2 provided inside the first outer wall 71b and the second outer wall 71c of the first member 71 are made in contact with the first inner wall 72b and the second inner wall 72c of the second member 72. The clad layer C3 of the third member 73 is made in contact with rear surfaces of the first edge 72f and the second edge 72g of the second member 72. The fourth member 74 has a portion provided with the clad layer C5, the portion being made in contact with the front surface of the coupling portion 72a of the second member 72, and has both left and right ends of a portion provided with the clad layer C4, the ends being caulked by the first claw 71d and the second claw 71e to be made in contact with rear surfaces of the first claw 71d and the second claw 71e.

The outdoor heat exchanger 11 thus temporarily assembled is heated in a furnace to melt the clad layers C1 to C5 to braze the first member 71, the second member 72, the third member 73, and the fourth member 74 each other. The outdoor heat exchanger 11 placed in a furnace has ambient temperature being exemplarily 1000° C. or more and 1300° C. or less.

(5) CHARACTERISTICS OF ONE OR MORE EMBODIMENTS (5-1)

In the gas header 70 of the outdoor heat exchanger 11 according to one or more embodiments, the clad layer C3 on the third member 73 positioned inside the first member 71 is larger in silicon content than the clad layer C1 and the clad layer C2 on the first member 71 positioned at the circumference.

When the members constituting the gas header 70 are brazed in a furnace or the like, even if the third member 73 at an inner position is not higher in temperature than the first member 71 at an outer position, the brazing filler material contained in the clad layer C3 on the third member 73 can generate more melt in comparison to a case where the clad layer C3 on the third member 73 is equal in silicon content to the clad layer C1 and the clad layer C2 on the first member 71.

This configuration achieves excellent joining by brazing of a member positioned inside the gas header 70. This configuration also achieves an excellent joining state of brazing with use of a clad layer positioned inside the gas header 70.

Specifically, when the gas side internal space 25 of the gas header 70 is increased to have a larger capacity, an inner member and an inner clad layer may have more difficulty in receiving heat during heating for brazing becomes evident. Even in such a case, joining by brazing can be excellently achieved with an increase in a melt rate by increasing silicon content of the member and the inner clad layer that have more difficulty in receiving heat.

(5-2)

When the flat tubes which are flat heat transfer tubes are inserted to a conventional gas header having a cylindrical shape, the flat tubes need to be inserted deeply to the gas header such that the entire ends of the flat tubes are positioned inside the gas header having the cylindrical shape. In the gas header having the cylindrical shape, the ends of the flat tubes are accordingly provided thereabove and therebelow with useless spaces allowing a refrigerant to be reserved. Such a tendency is more significant as the flat tubes have larger width.

In contrast, in the gas header 70 of the outdoor heat exchanger 11 according to one or more embodiments, the flat tube connection plate 71a of the first member 71 and the third member 73 have the plate shapes. Furthermore, the flat tubes 28 are inserted vertically to the flat tube connection plate 71a of the first member 71 and the third member 73. The first outer wall 71b and the second outer wall 71c extend vertically from both the left and right ends of the flat tube connection plate 71a of the first member 71, and the first inner wall 72b and the second inner wall 72c of the second member 72 are joined vertically to both the left and right ends of the third member 73.

The gas header 70 of the outdoor heat exchanger 11 according to one or more embodiments can thus decrease the useless spaces allowing a refrigerant to be reserved, around the ends of the flat tubes 28. This achieves reduction in pressure loss of a gas refrigerant flowing in the gas header 70.

(5-3)

In the gas header 70 of the outdoor heat exchanger 11 according to one or more embodiments, the first member 71 including the flat tube connection plate 71a is relatively thinned. When the flat tubes 28 are inserted to the flat tube connection openings 71x prior to joining by brazing, the inner circumferential surface of each of the flat tube connection openings 71x and the outer circumferential surface of the corresponding one of the flat tubes 28 generate less friction for facilitated insertion.

Even when the first member 71 including the flat tube connection plate 71a is relatively thinned, the flat tube connection plate 71a further has the third member 73 laminated in the thickness direction. This configuration can thus improve compressive strength of the gas header 70 at the portion connected with the flat tubes 28.

Furthermore, the outer edges of the internal openings 73x of the third member 73 are positioned outside the outer edges of the flat tube connection openings 71x provided in the flat tube connection plate 71a of the first member 71. Even when the brazing filler material interposed between the flat tube connection openings 71x of the flat tube connection plate 71a and the flat tubes 28 leaks toward the ends of the flat tubes 28 during brazing, the brazing filler material having leaked is sent outside the flat tubes 28, into spaces in the internal openings 73x of the third member 73. This inhibits the refrigerant passages 28b of each of the flat tubes 28 from being filled with the brazing filler material.

(5-4)

In the gas header 70 of the outdoor heat exchanger 11 according to one or more embodiments, the first projection 72d and the second projection 72e of the second member 72 have the minimum distance (transverse distance) smaller than the maximum width on the section vertical to the refrigerant passages 28*b* of each of the flat tubes 28. This configuration can thus set how deep the flat tubes 28 are inserted to the gas header 70.

The first projection 72*d* and the second projection 72*e* that define how deep the flat tubes 28 are inserted are both positioned closer to the flat tubes 28 than the anteroposterior center of the second member 72. This makes it possible to sufficiently increase the gas side internal space 25.

(6) MODIFICATION EXAMPLES

(6-1) Modification Example A

The embodiments described above exemplify the case where the coupling portion 72*a* couples the end of the first inner wall 72*b* and the end of the second inner wall 72*c* in the second member 72 included in the gas header 70 of the outdoor heat exchanger 11.

Figure 16:
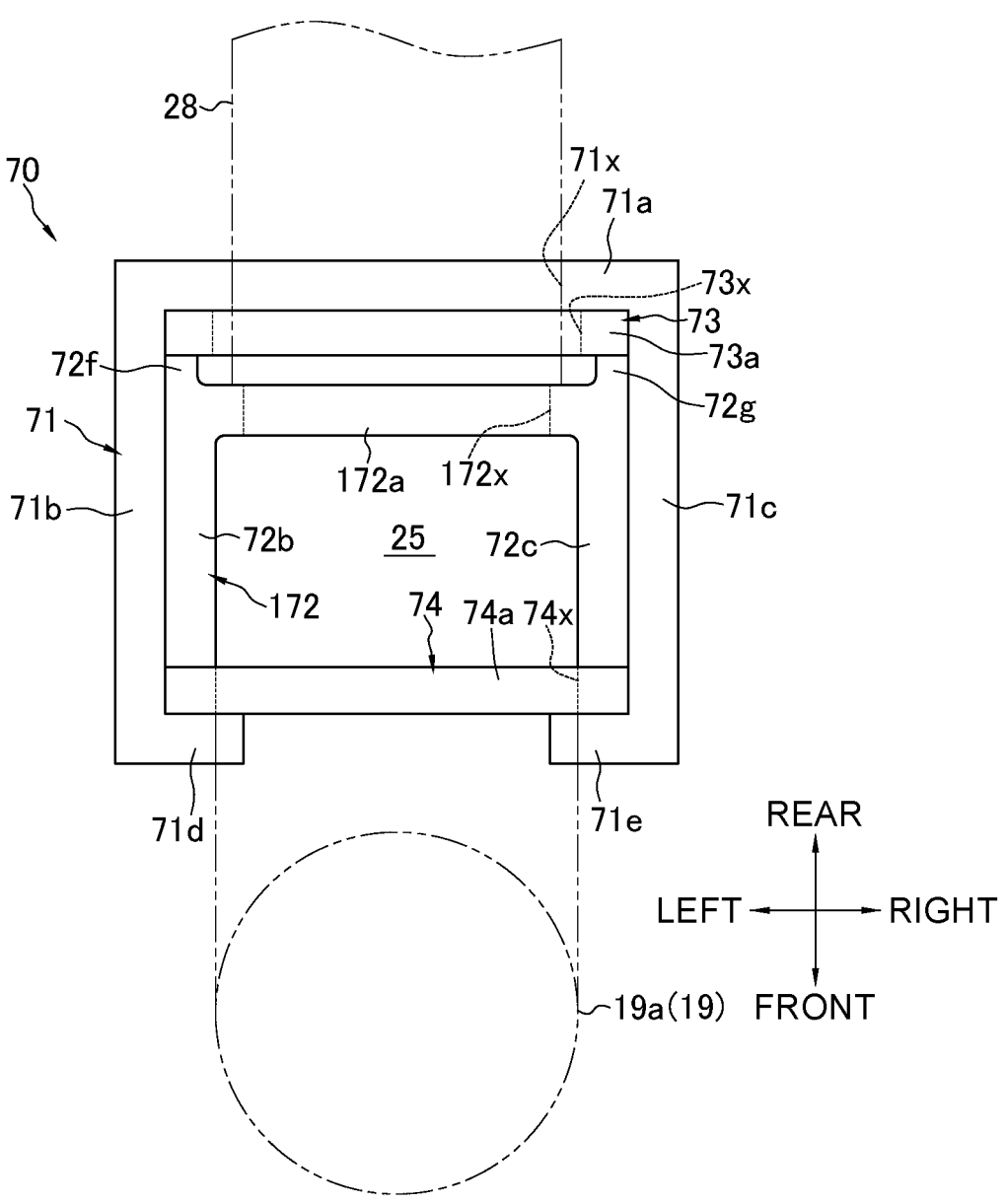
FIG. 16 is a planar sectional view depicting how the main gas refrigerant pipe connecting portion and a flat tube are connected to the gas header in a modification example A.
Figure 17:
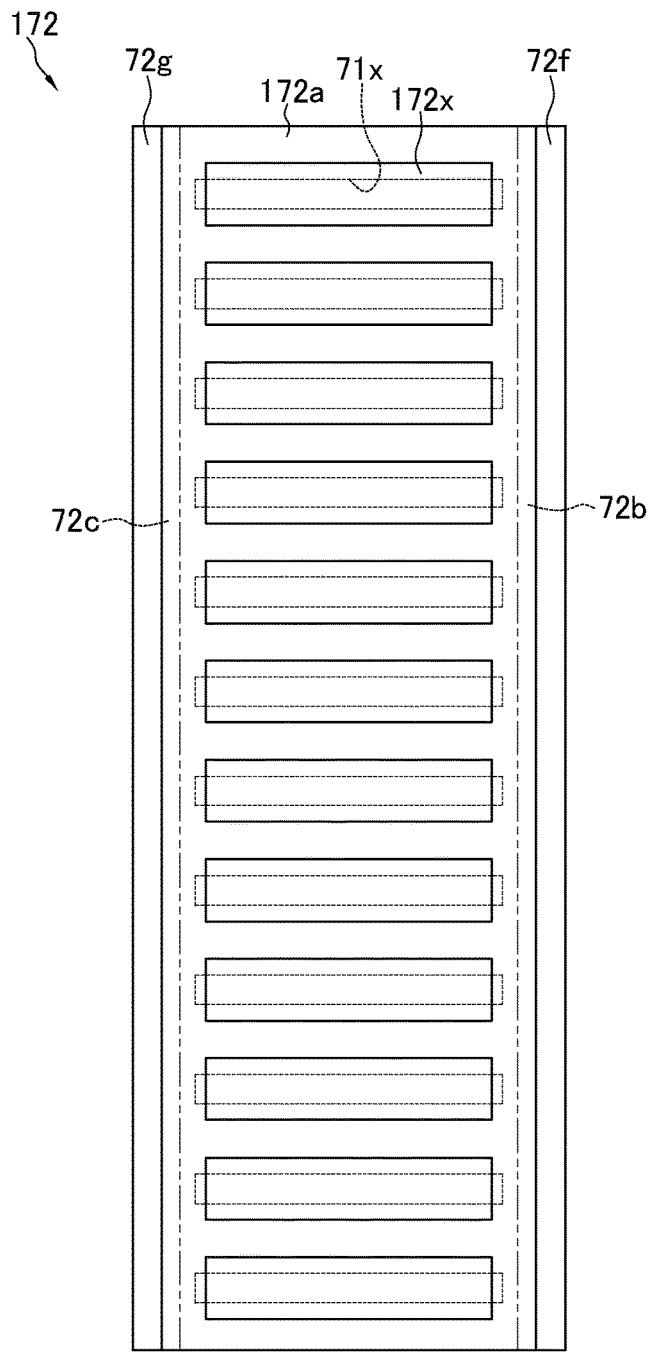
FIG. 17 is a projection view depicting positional relationship of openings in a case where the second member is viewed from behind in the modification example A.

The second member included in the gas header 70 of the outdoor heat exchanger 11 may alternatively be replaced with a second member 172 depicted in FIG. 16 and FIG. 17. FIG. 16 is a planar sectional view depicting how the main gas refrigerant pipe connecting portion 19*a* and the flat tube 28 are connected to the gas header 70. FIG. 17 is a projection view depicting positional relationship of openings in a case where the second member 172 is viewed from behind.

The second member 172 includes a coupling portion 172*a* in place of the coupling portion 72*a* of the second member 72 according to the above-described embodiments. The coupling portion 172*a* couples a portion between the both ends in the anteroposterior direction (the extending direction of the flat tubes 28) of the first inner wall 72*b* and a portion between the both ends in the anteroposterior direction (the extending direction of the flat tubes 28) of the second inner wall 72*c*. The coupling portion 172*a* couples the portions other than the ends, of the first inner wall 72*b* and the second inner wall 72*c* to achieve improvement in structural strength of the second member 172.

The coupling portion 172*a* is a plate-shaped portion expanding vertically and transversely. The coupling portion 172*a* has a plurality of internal gas pipe connection openings 172*x* aligned vertically. The internal gas pipe connection openings 172*x* are provided correspondingly to the flat tubes 28. The internal gas pipe connection openings 172*x* are larger in vertical size than the flat tubes 28 and the flat tube connection openings 71*x* of the first member 71, but are smaller in size in a width direction (transverse direction) than the flat tubes 28 and the flat tube connection openings 71*x* of the first member 71. This configuration can thus set how deep the flat tubes 28 are inserted. The internal gas pipe connection openings 172*x* have edges that can set how deep the flat tubes 28 are inserted, and there is thus no need to provide the first projection 72*d* or the second projection 72*e* of the second member 72 according to the above-described embodiments.

(6-2) Modification Example B

The above-described embodiments exemplify the case where the gas header 70 includes the third member 73 and the fourth member 74.

Figure 18:
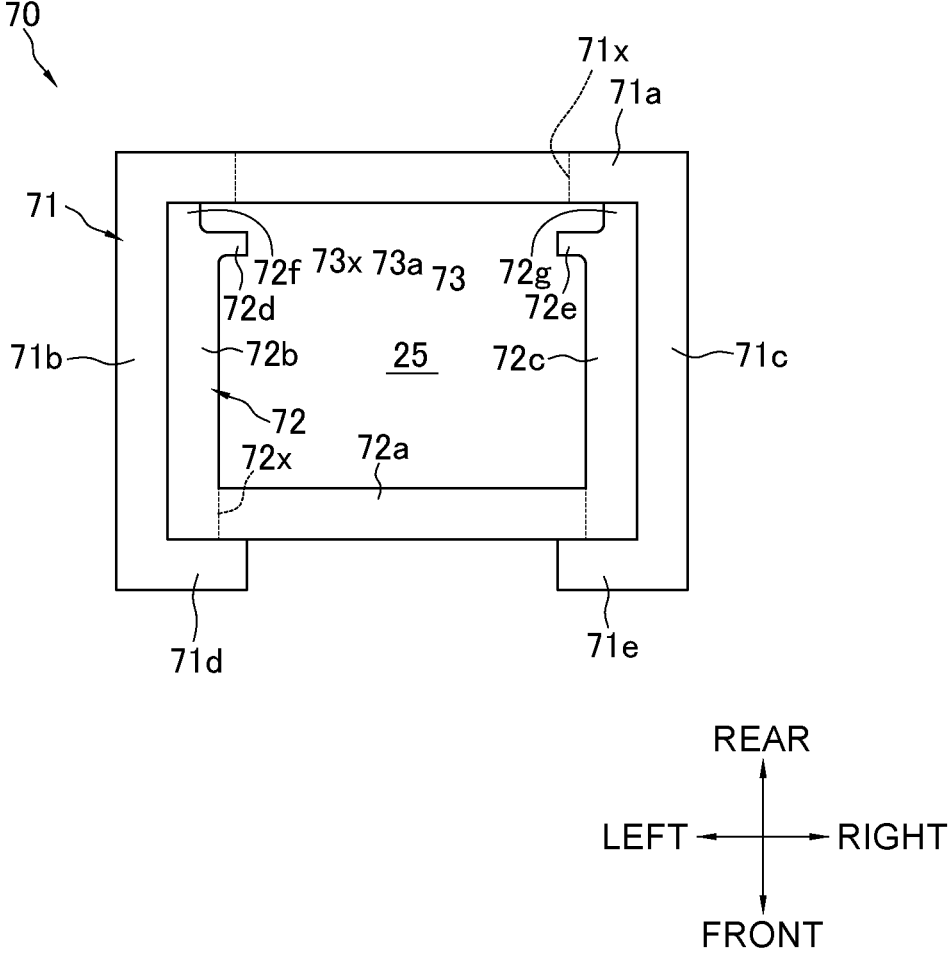
FIG. 18 is a planar sectional view of the gas header in a modification example B.

As exemplarily depicted in FIG. 18, the gas header 70 may alternatively exclude at least one of the third member 73 and the fourth member 74 according to the above-described embodiments.

In this case, the flat tube connection plate 71*a* of the first member 71 is made thicker to secure compressive strength.

(6-3) Modification Example C

The above-described embodiments exemplify the case where the clad layer C3 on the third member 73 positioned inside the gas header 70 is larger in silicon content than the clad layer C1 and the clad layer C2 on the first member 71 positioned outside the gas header 70.

Figure 19:
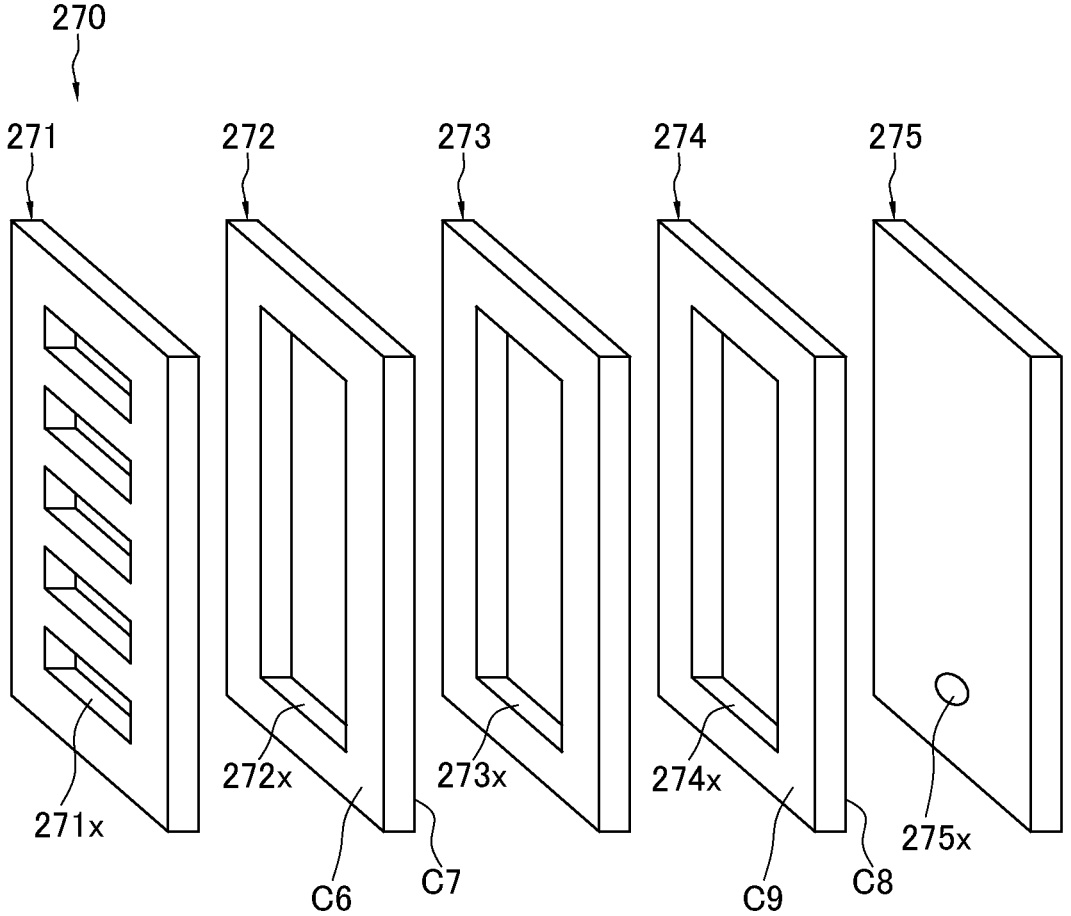
FIG. 19 is a schematic exploded perspective view of a header in a modification example C.

Alternatively, at least one of the gas header and the liquid header in the heat exchanger may be replaced with, for example, a header 270 obtained through joining by brazing members as depicted in FIG. 19.

The header 270 includes a first outer member 271, a first inner member 272, a second inner member 273, a third inner member 274, and a second outer member 275.

All of the first outer member 271, the first inner member 272, the second inner member 273, the third inner member 274, and the second outer member 275 are plate-shaped members. The first outer member 271, the first inner member 272, the second inner member 273, the third inner member 274, and the second outer member 275 are aligned in the mentioned order and are joined to each other by brazing.

The first outer member 271 (exemplifying a first member or exemplifying a fifth member) has a plurality of heat transfer tube connection openings 271*x* connected with a plurality of heat transfer tubes such as the flat tubes 28 described in the above-described embodiments. The heat transfer tube connection openings 271*x* penetrate in the thickness direction. The plurality of heat transfer tube connection openings 271*x* is aligned in a longitudinal direction of the first outer member 271.

The first inner member 272 (exemplifying a third member or exemplifying a seventh member) is joined by brazing to the first outer member 271. The first inner member 272 has a first internal opening 272*x* to be communicable with the plurality of heat transfer tube connection openings 271*x*.

The second inner member 273 (exemplifying a second member or exemplifying a sixth member) has a first surface joined by brazing to the first inner member 272 and a second surface joined by brazing to the third inner member 274. The second inner member 273 has a second internal opening 273*x* similar in size to the first internal opening 272*x* of the first inner member 272.

The third inner member 274 (exemplifying the third member or exemplifying the seventh member) is joined by brazing to the second outer member 275. The third inner member 274 has a third internal opening 274*x* similar in size to the second internal opening 273*x* of the second inner member 273.

The second outer member 275 (exemplifying the first member or exemplifying the fifth member) has an external refrigerant pipe connection opening 275*x* connected with the main gas refrigerant pipe connecting portion 19*a* or the like described in the above-described embodiments or a refrigerant pipe as a liquid refrigerant pipe. The external refrigerant pipe connection opening 275*x* penetrates in the thickness direction. The external refrigerant pipe connection opening 275*x* communicates with the third internal opening 274*x* of the third inner member 274.

In the configuration described above, a clad layer is provided on each surface of at least both surfaces of the first inner member 272 and both surfaces of the third inner member 274. Specifically, a clad layer C6 (exemplifying a brazing layer between the first member and the second member, exemplifying a brazing layer between the first member and the third member, or exemplifying a first clad layer) is provided on the first outer member 271 side surface of the first inner member 272. A clad layer C7 (exemplifying a brazing layer between the second member and the third member, or exemplifying a second clad layer) is provided on the second inner member 273 side surface of the first inner member 272. A clad layer C8 (exemplifying the brazing layer between the first member and the second member, exemplifying the brazing layer between the first member and the third member, or exemplifying the first clad layer) is provided on the second outer member 275 side surface of the third inner member 274. A clad layer C9 (exemplifying the brazing layer between the second member and the third member, or exemplifying the second clad layer) is provided on the second inner member 273 side surface of the third inner member 274.

Each of the clad layers C6 to C9 contains silicon, and contains an Al—Si alloy or the like. The clad layer C7 is larger in silicon content than the clad layer C6. The clad layer C9 is larger in silicon content than the clad layer C8.

In the configuration described above, it is difficult for the second inner member 273 to receive heat in a case of joining by brazing while the first outer member 271, the first inner member 272, the second inner member 273, the third inner member 274, and the second outer member 275 are laminated and a heat source is disposed at least one of the first outer member 271 side and the second outer member 275 side. However, the clad layer C7 is larger in silicon content than the clad layer C6 and the clad layer C9 is larger in silicon content than the clad layer C8. Thus, the clad layer C7 and the clad layer C9 far from the heat source can also achieve an increase in a melt rate for excellent joining by brazing.

(6-4) Modification Example D

The above-described embodiments and the modification examples exemplify the case where, in two clad layers joining members, the clad layer far from the heat source is larger in silicon content than the clad layer close to the heat source to achieve an increase in a melt rate for excellent joining by brazing.

Alternatively, there may be provided three or more clad layers joining members varied in distance from the heat source and the clad layers are aligned such that a clad layer further from the heat source has a larger silicon content, to achieve an increase in the melt rate for excellent joining by brazing.

Although the present disclosure has been described with respect to only a limited number of embodiments, those skilled in the art, having benefit of this disclosure, will appreciate that various other embodiments may be devised without departing from the scope of the present disclosure. Accordingly, the scope of the present disclosure should be limited only by the attached claims.

REFERENCE SIGNS LIST

1: air conditioner (heat pump device)
11: outdoor heat exchanger (heat exchanger)
28: flat tube (heat transfer tube)
70: gas header (header)
71: first member
71a: flat tube connection plate (first portion)
71x: flat tube connection opening (opening)
72: second member

73: third member
73x: internal opening (second opening)
C1: clad layer
C2: clad layer (brazing layer between first member and second member, brazing layer between first member and third member, or clad layer of first member)
C3: clad layer (brazing layer between second member and third member, or clad layer of third member)
C6: clad layer (brazing layer between first member and second member, brazing layer between first member and third member, or first clad layer)
C7: clad layer (brazing layer between second member and third member, or second clad layer)
C8: clad layer (brazing layer between first member and second member, brazing layer between first member and third member, or first clad layer)
C9: clad layer (brazing layer between second member and third member, or second clad layer)
270: header
271: first outer member (first member or fifth member)
272: first inner member (third member or seventh member)
273: second inner member (second member or sixth member)
274: third inner member (third member or seventh member)
275: second outer member (first member or fifth member)
271x: heat transfer tube connection opening (opening)

The invention claimed is:

1. A heat exchanger comprising:
a header comprising:
   a first member that includes a second brazing layer disposed on an inner surface of the first member;
   a second member; and
   a third member that includes a first brazing layer, wherein
   the first brazing layer of the third member is adjacent to the second member,
   the second brazing layer includes:
      a first portion of the second brazing layer is adjacent to the second member; and
      a second portion of the second brazing layer is adjacent to the third member; and
heat transfer tubes connected to the header, wherein
at a predetermined temperature with in a range of 580° C. or more and 660° C. or less, a melt rate of the first brazing layer is larger than a melt rate of the second brazing layer,
in a view along a longitudinal axis of the header:
   the second member and third member are disposed within a perimeter defined by the first member, and
   the first brazing layer is entirely disposed within a perimeter defined by the first portion and the second portion of the second brazing layer on the inner surface of the first member,
the second member includes:
   a first protrusion protruding from a first wall toward a second wall; and
   a second protrusion protruding from the second wall toward the first wall,
a first edge of the first wall is disposed closer to the heat transfer tubes than the first protrusion,
a second edge of the second wall is disposed closer to the heat transfer tubes than the second protrusion.

2. The heat exchanger according to claim 1, wherein the first member comprises a planar first portion having first openings that accommodate the heat transfer tubes, the third member is plate-shaped and has second openings that accommodate the heat transfer tubes, and the first portion and the third member are laminated in a thickness direction perpendicular to planes of the first portion and the third member.

3. The heat exchanger according to claim 2, wherein in a view in an extending direction of the heat transfer tubes, each of the first openings has an outline inside an outline of a corresponding one of the second openings.

4. The heat exchanger according to claim 1, wherein each of the first member, the second member, and the third member contains aluminum or an aluminum alloy.

5. The heat exchanger according to claim 1, wherein each of the first member, the second member, and the third member has a thickness equal to or less than 3 mm.

6. A heat pump device comprising the heat exchanger according to claim 1.

7. The heat exchanger according to claim 1, wherein a width of the first brazing layer between the second member and the third member at the first edge that is less than a thickness of the first wall disposed between the first protrusion and a coupling portion that couples the first wall and the second wall, and a width of the first brazing layer between the second member and the third member at the second edge is less than a thickness of the second wall disposed between the second protrusion and the coupling portion.

8. The heat exchanger according to claim 1, wherein the second member includes:

a coupling portion having one end portion and an other end portion in the view along the longitudinal axis of the header, a first wall extending from the one end portion of the coupling portion toward an extending direction of the heat transfer tubes; and a second wall extending from the other end portion of the coupling portion toward the extending direction of the heat transfer tubes, and in the view along the longitudinal axis of the header, a longitudinal direction of the coupling portion is perpendicular to both a longitudinal direction of the first wall and a longitudinal direction of the second wall.

9. A heat exchanger comprising:

a header comprising:

a first member that includes a second brazing layer disposed on an inner surface of the first member;

a second member; and a third member that includes a first brazing layer, wherein the first brazing layer of the third member is adjacent to the second member, the second brazing layer includes:

a first portion of the second brazing layer is adjacent to the second member; and a second portion of the second brazing layer is adjacent to the third member; and heat transfer tubes connected to the header, wherein at a predetermined temperature with in a range of 580° C. or more and 660° C. or less, a melt rate of the first brazing layer is larger than a melt rate of the second brazing layer, in a view along a longitudinal axis of the header:

the second member and third member are disposed within a perimeter defined by the first member, and the first brazing layer is entirely disposed within a perimeter defined by the first portion and the second portion of the second brazing layer on the inner surface of the first member, the second member includes:

a coupling portion having one end portion and an other end portion in the view along the longitudinal axis of the header, a first wall extending from the one end portion of the coupling portion toward an extending direction of the heat transfer tubes; and a second wall extending from the other end portion of the coupling portion toward the extending direction of the heat transfer tubes, and in the view along the longitudinal axis of the header, a longitudinal direction of the coupling portion is perpendicular to both a longitudinal direction of the first wall and a longitudinal direction of the second wall.

* * * * *